US011993279B1

(12) United States Patent
Roy

(10) Patent No.: US 11,993,279 B1
(45) Date of Patent: May 28, 2024

(54) AUTOMATICALLY ADJUSTABLE CAMBER AND CASTER FOR AUTONOMOUS VEHICLE

(71) Applicant: Matthew Macgregor Roy, Montreal (CA)

(72) Inventor: Matthew Macgregor Roy, Montreal (CA)

( * ) Notice: Subject to any disclaimer, the term of this patent is extended or adjusted under 35 U.S.C. 154(b) by 7 days.

(21) Appl. No.: 16/995,775

(22) Filed: Aug. 17, 2020

Related U.S. Application Data

(60) Provisional application No. 62/888,856, filed on Aug. 19, 2019.

(51) Int. Cl.
| | |
|---|---|
| *B60W 30/045* | (2012.01) |
| *B60W 40/10* | (2012.01) |
| *B60W 50/14* | (2020.01) |
| *B60W 60/00* | (2020.01) |
| *G01C 21/34* | (2006.01) |
| *G01S 19/42* | (2010.01) |

(52) U.S. Cl.
CPC ........ *B60W 60/001* (2020.02); *B60W 30/045* (2013.01); *B60W 40/10* (2013.01); *B60W 50/14* (2013.01); *G01C 21/3453* (2013.01); *G01S 19/42* (2013.01); *B60W 2050/146* (2013.01); *B60W 2520/00* (2013.01); *B60W 2552/00* (2020.02)

(58) Field of Classification Search
CPC .... B60W 60/001; B60W 40/10; B60W 50/14; B60W 30/045; B60W 2552/00; B60W 2050/146; B60W 2520/00; G01C 21/3453; G01S 19/42
See application file for complete search history.

(56) References Cited

U.S. PATENT DOCUMENTS

| | | | | |
|---|---|---|---|---|
| 5,452,606 A | * | 9/1995 | Castelnuovo | G01B 5/255 33/203 |
| 10,759,416 B1 | * | 9/2020 | Funke | B62D 17/00 |
| 10,821,981 B1 | * | 11/2020 | Funke | B62D 17/00 |
| 2012/0158229 A1 | * | 6/2012 | Schaefer | B60L 53/11 701/22 |
| 2019/0164363 A1 | * | 5/2019 | Javid | B60W 40/12 |
| 2019/0375455 A1 | * | 12/2019 | No | B60G 17/018 |
| 2020/0223270 A1 | * | 7/2020 | Kunkel | B60G 7/006 |
| 2020/0307344 A1 | * | 10/2020 | Hille | B60G 17/01908 |

FOREIGN PATENT DOCUMENTS

JP         5338620 B2  *  11/2013

OTHER PUBLICATIONS

Yao et al., McPherson suspension simulation analysis method based on Adams (Year: 2013).*

* cited by examiner

*Primary Examiner* — Elaine Gort
*Assistant Examiner* — Chanmin Park

(57) ABSTRACT

An autonomous vehicle comprises a chassis, a plurality of wheels rotationally mounted to the chassis, wherein each wheel is characterized by a camber angle and a caster angle. The vehicle includes a vehicle dynamics prediction module for predicting a vehicle dynamics condition and for generating a control signal based on the vehicle dynamics condition and a wheel geometry adjustment mechanism connected to each of the wheels for automatically adjusting one or both of the camber angle and the caster angle in response to the control signal.

20 Claims, 20 Drawing Sheets

AUTOMATICALLY ADJUSTABLE CAMBER AND CASTER FOR AUTONOMOUS VEHICLE

CROSS-REFERENCE TO RELATED APPLICATIONS

This application claims priority from U.S. Provisional Patent Application No. 62/888,856 entitled "Automatically Adjustable Camber and Caster for Autonomous Vehicle" filed Aug. 19, 2019.

TECHNICAL FIELD

The present invention relates generally to self-driving or autonomous vehicles and, in particular, to technologies for automatically adjusting wheel geometry by autonomous vehicles.

BACKGROUND

Autonomous or self-driving vehicles use sensors such as RADAR, LIDAR and/or cameras to provide signals to a processor or controller that generates and outputs steering, acceleration and braking signals to the vehicle to thereby autonomously drive the vehicle without direct user control. A Global Navigation Satellite System (GNSS) receiver such as a Global Positioning System (GPS) receiver is also used for navigation. As the self-driving vehicle drives autonomously toward a destination, the vehicle will encounter other self-driving vehicles. Self-driving vehicles in a given area of a road mutually sense each other's presence using various sensors for collision avoidance and may communicate, via vehicle-to-vehicle messaging protocols, with each other to avoid collisions.

Wheel camber and caster geometries are typically fixed for vehicles whether they are conventionally human-driven vehicles or autonomous (self-driving) vehicles. Camber angle β is defined as the angle between the vertical axis of the wheels used for steering and the vertical axis of the vehicle when viewed from the front or rear. Caster angle θ is defined as the angle between the steering axis and the vertical axis of a steered wheel viewed from the side of the vehicle.

Some technologies (U.S. Pat. Nos. 6,267,387 and 9,102,207) have disclosed mechanical systems that react to vehicle dynamics to adjust the wheel camber. Reactive mechanical systems may suffer from lag times, limiting the efficacy of such systems.

A new or improved technology to dynamically adjust camber angle and/or caster angle is highly desirable.

SUMMARY

In general, the present invention provides an autonomous (self-driving) vehicle that predicts vehicle dynamics (e.g. cornering) and automatically adjusts the camber angle and/or the caster angle of one or more wheels of the vehicle so that the vehicle's performance (e.g. cornering performance) is enhanced.

One inventive aspect of the disclosure is an autonomous vehicle comprising a chassis, a plurality of wheels rotationally mounted to the chassis, wherein each wheel is characterized by a camber angle and a caster angle. The vehicle includes a vehicle dynamics prediction module for predicting a vehicle dynamics condition and for generating a control signal based on the vehicle dynamics condition and a wheel geometry adjustment mechanism connected to each of the wheels for automatically adjusting one or both of the camber angle and the caster angle in response to the control signal.

Another inventive aspect of the disclosure is an autonomous vehicle comprising a chassis and a plurality of wheels rotationally mounted to the chassis, wherein each wheel is characterized by a camber angle. A vehicle dynamics prediction module predicts a vehicle dynamics condition and generates a control signal based on the vehicle dynamics condition. A camber adjustment actuator automatically adjusts the camber angle in response to the control signal.

Another inventive aspect of the disclosure is an autonomous vehicle comprising a chassis and a plurality of wheels rotationally mounted to the chassis, wherein each wheel is characterized by a caster angle. A vehicle dynamics prediction module predicts a vehicle dynamics condition and generates a control signal based on the vehicle dynamics condition. A caster adjustment actuator automatically adjusts the caster angle in response to the control signal.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
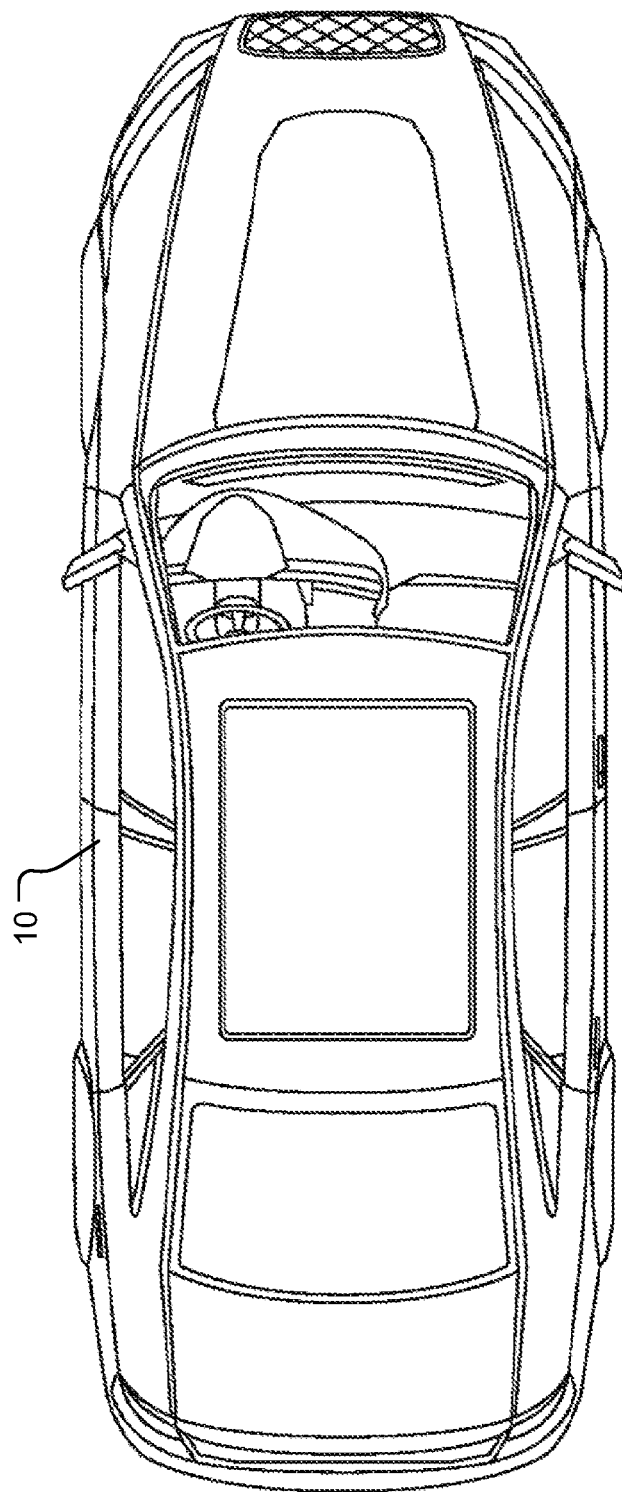
FIG. 1 is a top view of an autonomous ("self-driving") vehicle in accordance with an embodiment of the present invention.
Figure 2:
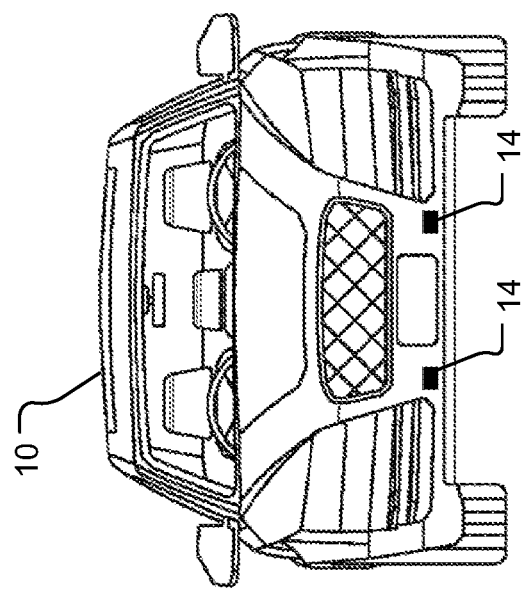
FIG. 2 is a front view of the autonomous vehicle of FIG. 1.
Figure 3:
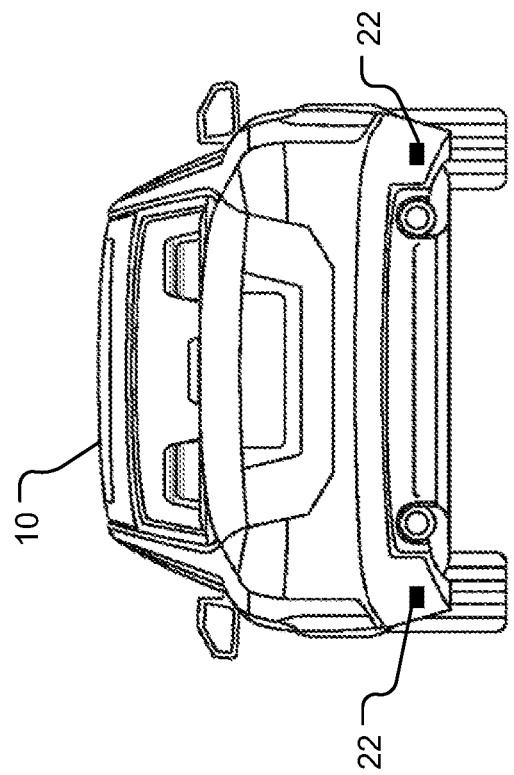
FIG. 3 is a rear view of the autonomous vehicle of FIG. 1.
Figure 4:
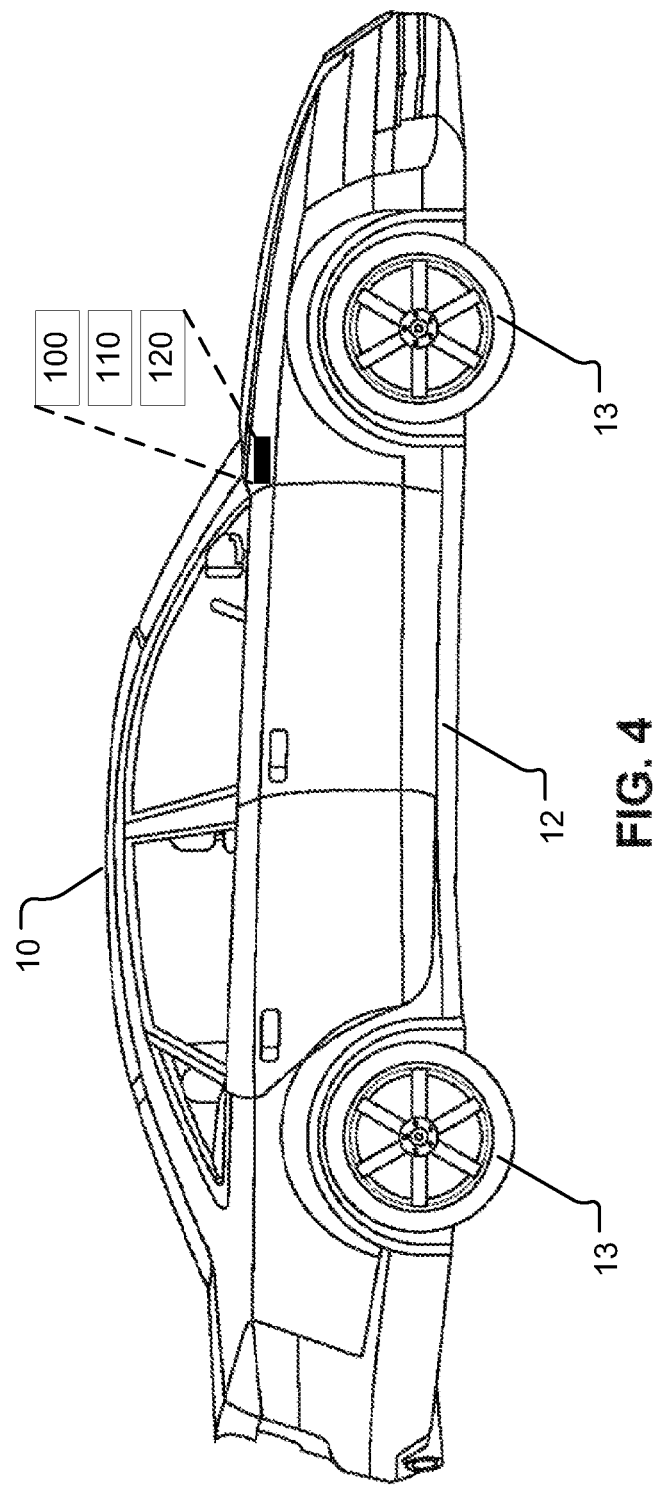
FIG. 4 is a right side view of the autonomous vehicle of FIG. 1.
Figure 5:
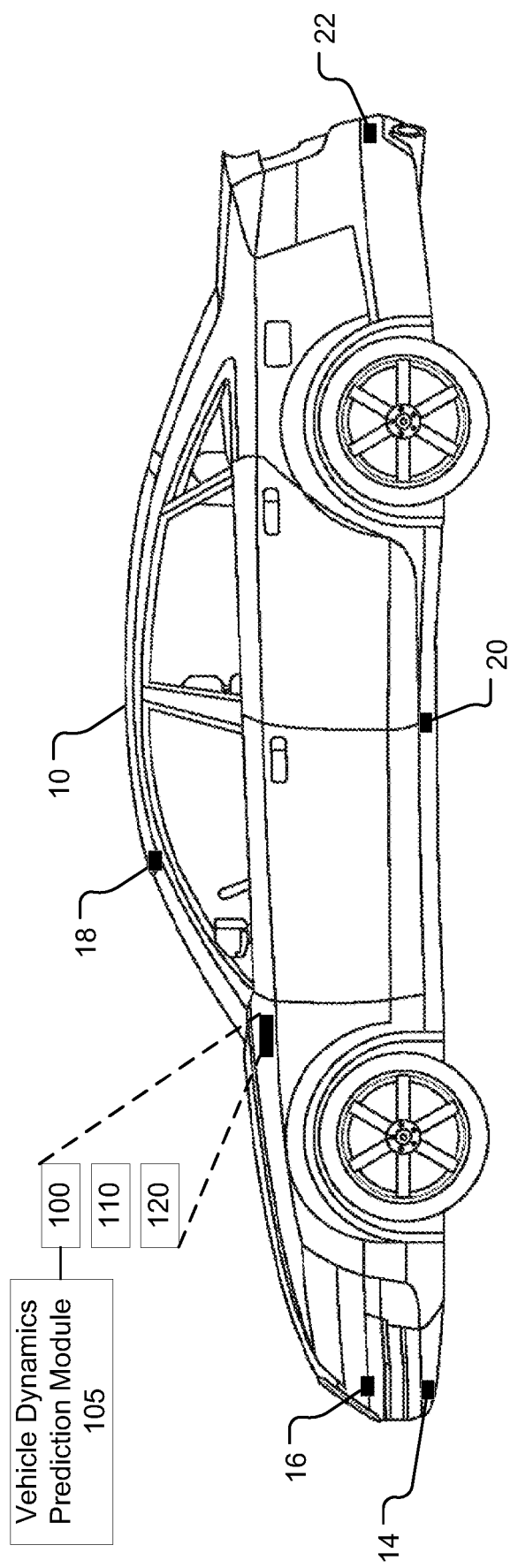
FIG. 5 is a left side view of the autonomous vehicle of FIG. 1.

Disclosed herein are various embodiments of a self-driving (autonomous) vehicle capable of automatically adjusting the camber angle and/or caster angle by predicting a vehicle dynamics condition so as to dynamically or pre-emptively adjust the camber angle and/or caster angle to improve vehicle dynamics. In some embodiments, the autonomous vehicle may predict a cornering force based on a curve of a roadway over which the vehicle is traveling using vehicle speed, location and a navigation map. In some embodiments, the vehicle pre-emptively adjusts the caster angle and/or caster angle as the vehicle approaches a curve or corner to thereby improve cornering performance. Alternatively, the vehicle may adjust the caster angle and/or caster angle while cornering.

In some embodiments, only the camber is adjusted (i.e. not the caster). The camber may be adjusted based on predicted vehicle dynamics, e.g. when turning or cornering. The camber may also be adjusted to compensate for lateral road slope. Lateral road slope data may in some embodiments be transmitted from vehicle to vehicle, either directly or indirectly via a road slope server.

For the purposes of this specification, the terms "autonomous vehicle" or "self-driving vehicle" are meant to encompass any land vehicle having wheels such as a car, van, minivan, sports utility vehicle (SUV), crossover-type vehicle, bus, minibus, truck, tractor-trailer, semi-trailer, construction vehicle, work vehicle, offroad vehicle, electric cart, or the like. The terms "autonomous vehicle" and "self-driving vehicle" are meant to encompass any vehicle having environment-detecting sensors and a processor, controller, computer, computing device or computer system for autonomously steering, accelerating and braking the vehicle, i.e. self-driving or driving autonomously, without a driver physically touching, interacting with or providing direct or immediate input to the steering wheel, accelerator pedal and brake pedal.

FIGS. 1-5 depict a self-driving car 10 as one exemplary implementation of a self-driving vehicle or autonomous vehicle (AV). The self-driving vehicle or autonomous vehicle 10 includes, in the illustrated embodiment, a vehicle chassis 12 and a plurality of wheels 13, a motor supported by the chassis for providing propulsive power for the vehicle, a braking system for braking (decelerating) the vehicle and a steering system for steering the vehicle via a steering mechanism which is usually connected to the front wheels. The motor may be an internal combustion engine, e.g. a gas engine or a diesel engine. The motor may alternatively be an electric motor. The motor may be a hybrid-electric power plant. In a variant, the vehicle may have multiple electric motors for driving different wheels. In another variant, the motor may be a hydrogen fuel cell. The vehicle may include a powertrain to transfer power from the motor to the drive wheels. For some vehicles, the powertrain may include, in addition to the motor (engine), a transmission gearbox, a drive shaft, and a differential. For an electric vehicle implementation, the vehicle includes a rechargeable battery or plurality of rechargeable batteries.

The vehicle 10 may also be a mixed-mode human-drivable and self-drivable vehicle such as a self-driving car, truck, van, etc. that can be optionally driven directly by a human driver sitting in the driver's seat in which case the vehicle has two operating modes: (i) a conventional human driver mode with a human directly driving the vehicle using the steering wheel, brake pedal and accelerator as is conventionally done with non-autonomous vehicles; (ii) a self-driving (or autonomous) mode in which the vehicle's processor or computing system drives autonomously without direct human input, whether a human is seated in the driver's seat or not.

The autonomous vehicle 10 depicted by way of example in FIGS. 1-5 includes a plurality of sensors i.e. environment-detecting sensors for collision avoidance and following a road. The sensors may include RADAR, LIDAR, cameras and ultrasonic rangefinders. The autonomous (or self-driving) vehicle 10 further includes a self-driving processor, processors or computing device(s) configured to receive analog or digital signals (data) from the sensors and to generate steering, acceleration and braking control signals for controlling the steering system, the motor and the braking system of the vehicle. The autonomous driving processor may generate a steering control signal, an acceleration control signal and a braking control signal based on the signals received from the sensors. The autonomous driving processor may also generate other control signals for other subsystems and equipment on the vehicle, e.g. a turn indicator light control signal, a horn control signal, a headlight control signal, a transmission selector signal, an ignition shutoff signal, an ignition start-up signal, a door lock signal, a door unlock signal, a windshield defroster signal, a windshield wiper activation signal, a wiper fluid squirt signal, climate control signal, headlight activation signal, to name but a few.

In the illustrated embodiment of FIGS. 1-5, the vehicle has a first sensor 14, a second sensor 16, a third sensor 18, and a fourth sensor 20. In the illustrated embodiment of FIGS. 1-5, the first, second, third and fourth sensors can be visible-spectrum cameras, infrared cameras and/or thermal imaging cameras. One or more of the sensors can be RADAR or LIDAR. As noted above, one or more of the autonomous driving sensors of the vehicle can double as road slope sensors. Additional sensors may be provided on the vehicle 10, including additional cameras, additional LIDAR and RADAR sensors. The location of the sensors on the vehicle may be varied from what is shown in the figures. A different suite of sensors from what is illustrated may be used in other variants. These sensors are communicatively connected, either by wired or wireless channels, to the processor 100 for executing the autonomous driving functions based on the sensor input. The processor 100 may be coupled to a memory.

The autonomous (self-driving) vehicle 10 depicted by way of example in FIGS. 1-5 further includes a data transceiver 110, e.g. a cellular data transceiver, short-range wireless transceiver, a satellite transceiver or any other radiofrequency data transceiver. The data transceiver 110 may be any suitable wireless data transceiver for transmitting and receiving data wirelessly. In one main embodiment, the data transceiver is a cellular data transceiver (e.g. GSM, LTE, 5G or equivalent) that transmits data to a remote internet-connected server or servers whose functionality will be further described below.

The autonomous vehicle 10 depicted by way of example in FIGS. 1-5 further includes a Global Navigation Satellite System (GNSS) receiver 120 for receiving satellite signals and for determining a current location of the autonomous vehicle. The GNSS receiver 120 may be a Global Positioning System (GPS) receiver that decodes satellite signals transmitted by orbiting GNSS satellites. The GNSS (or GPS) receiver may be part of the vehicle navigation system. The GNSS or GPS receiver (e.g. in the form of a chip or chipset) receives GNSS/GPS radio signals transmitted from one or more orbiting GNSS/GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

In the embodiment of the autonomous vehicle 10 depicted in FIGS. 1-5, each one of the plurality of wheels 13 rotationally mounted to the chassis 12 is characterized by a camber angle and a caster angle. In the embodiment depicted in FIGS. 1-5, the vehicle 10 includes a vehicle dynamics prediction module for predicting a vehicle dynamics condition (e.g. a cornering force) and for generating a control signal based on the vehicle dynamics condition. The vehicle 10 includes a wheel geometry adjustment mechanism connected to each of the wheels for automatically adjusting one or both of the camber angle and the caster angle in response to the control signal. The wheel geometry adjustment mechanism may be a camber adjustment mechanism, a caster adjustment mechanism or a combined mechanism for adjusting both camber and caster.

The processor 100 executes, in some embodiments, a vehicle dynamics prediction module 105. The vehicle dynamics prediction module 105 may be a software module executed by the processor 100 to compute expected forces, e.g. cornering forces, on the wheels based on sensor input. For example, the vehicle dynamics prediction module 105 may receive current location data from the GNSS 120 and receive a current vehicle speed from an onboard vehicle speed sensor from which the vehicle dynamics prediction module 105 can determine based on the autonomous vehicle's current routing whether the vehicle is about to encounter a turn, how sharp the turn is, and at what predicted speed the vehicle will take the turn. From the speed and radius of curvature of the turn, the vehicle dynamics prediction module 105 can calculate the expected cornering forces on each of the four wheels. The vehicle dynamics prediction module 105 can then determine an optimal, or at least a more effective, camber angle for each of the wheels. The vehicle dynamics prediction module 105 can also, or alternatively, determine an optimal, or at least a more effective, caster angle for each of the wheels. In one implementation, the vehicle dynamics prediction module 105 can compute caster or camber angles for pairs of wheels, e.g. for a front pair, a rear pair, a left pair or a right pair. For example, the vehicle dynamics prediction module 105 may be configured to automatically adjust rear wheels to have a rear camber angle and to automatically adjust front wheels to have a front camber angle wherein the front camber angle is different from the rear camber angle. In one embodiment, left-side wheels are adjusted to have positive camber and right-side wheels are adjusted to have negative camber when cornering left and wherein left-side wheels are adjusted to have negative camber and right-side wheels are adjusted to have positive camber when cornering right.

Figure 6:
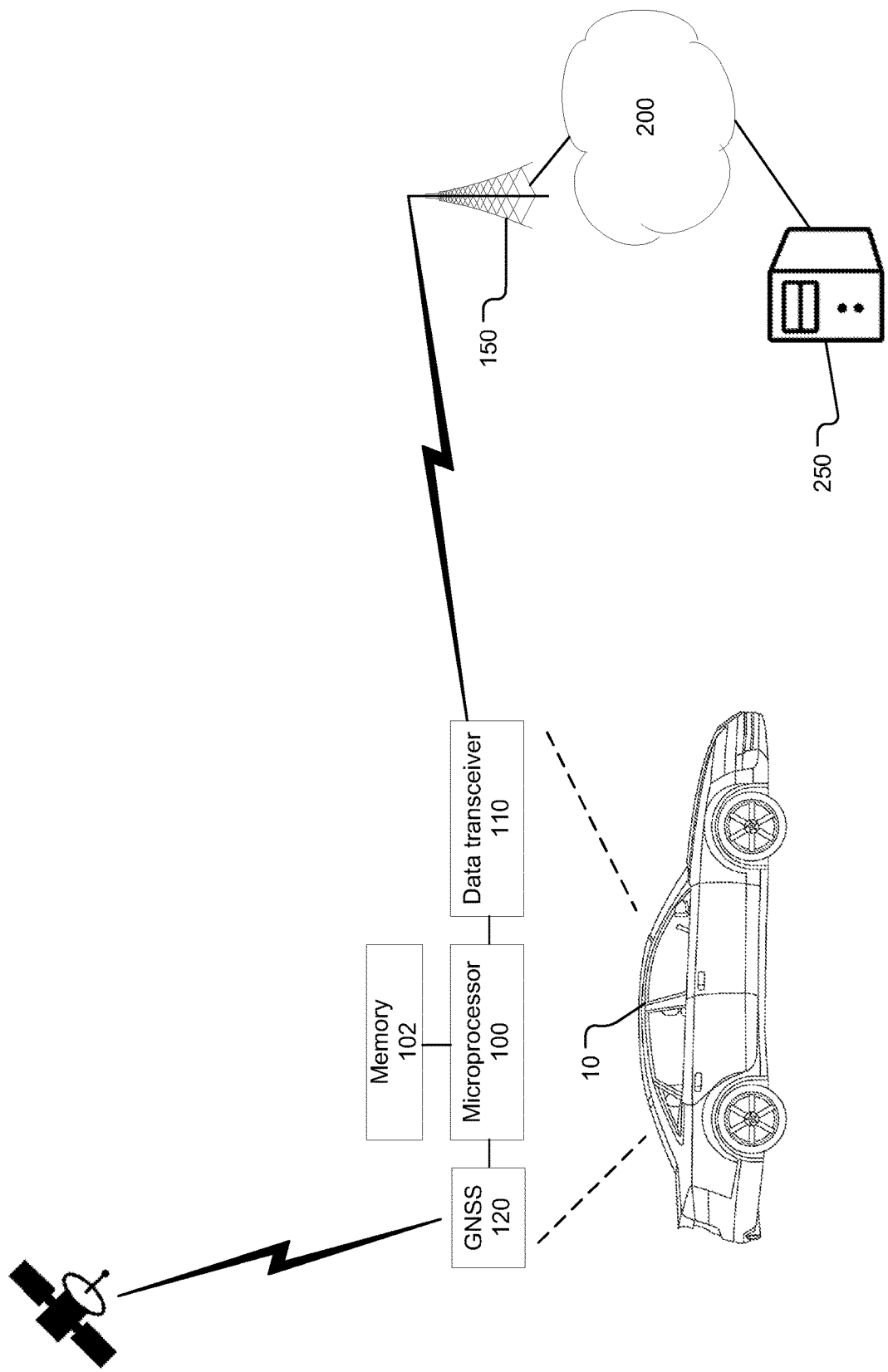
FIG. 6 illustrates a system including an autonomous vehicle connected wirelessly to a server for providing road data to the autonomous vehicle to enable the autonomous vehicle to pre-emptively adjust camber and/or caster.

FIG. 6 depicts a system in which an autonomous vehicle 10 communicates with a remote network-connected server 250 to obtain or provide road data. For example, the road data may be lateral road slope data which is a measure of the slope of the road in a direction perpendicular to the direction of travel. The wheel geometry for one or more of the wheels may be automatically adjusted by the processor 100 while driving to compensate for the effects of the lateral road slope.

The road data, e.g. the lateral road slope data, may be obtained from the network-connected server 250 shown in FIG. 6 using the data transceiver 110 of the autonomous vehicle 10. The data transceiver 110 in this example is a cellular data transceiver configured to wirelessly communicate data from the vehicle 10 to the server 250 by attaching communicatively to a base transceiver station 150. Data is transmitted and received over a cellular wireless network using cellular communication protocols and standards for packet data transfer such as GSM, CDMA, GPRS, EDGE, UMTS, LTE, etc. The vehicle 10 may include a Subscriber Identity Module (SIM) card for GSM-type communications or a Re-Usable Identification Module (RUIM) card for CDMA-type communications. The packetized data transmitted to the base transceiver station 150 is then routed through the internet 200 to the server 250 which receives, processes, stores and distributes road data such as for example lateral road slope data to other vehicles.

In this particular example, the processor (or microprocessor) 100 of the autonomous vehicle 10 is communicatively coupled to a memory 102 for storing navigation data (e.g. a route), vehicle dynamics data (e.g. expected cornering forces), lateral road slope data (e.g. received from the server) and wheel geometry data (e.g. caster angles and/or camber angles). The processor 100 cooperates with the data transceiver 110 to request and receive the lateral road slope data.

In a variant, the autonomous vehicle can collect and transmit new lateral road slope data to the server. The lateral road slope data may be sent along with location coordinates from the GNSS receiver 120 so that the server 250 can store location-specific lateral road slope data. The location-tagged lateral road slope data may also be stored by the vehicle for its own use, e.g. when returning home over the same route or shared with other nearby vehicles. The slope data may also be time-stamped in addition to being location-tagged.

In the system depicted in FIG. 6, the autonomous vehicle 10 can connect, or remain persistently connected, to the server 250 for providing road data to the autonomous vehicle 10 to enable the autonomous vehicle 10 to pre-emptively adjust camber and/or caster. Pre-emptive adjustment means that the camber/caster adjustment is complete just prior to reaching the corner. In a variant, the vehicle can perform the adjustment while cornering. Thus, in one embodiment, the camber/caster adjustment is performed while driving (moving); however, in another embodiment, the camber/caster adjustment is performed while the vehicle is stopped (stationary). For example, the camber may be increased for cornering and then decreased for a straight-away. As another example, the camber may be decreased when hard braking or emergency is predicted. Similarly, the camber may be decreased when hard acceleration is predicted.

Figure 7:
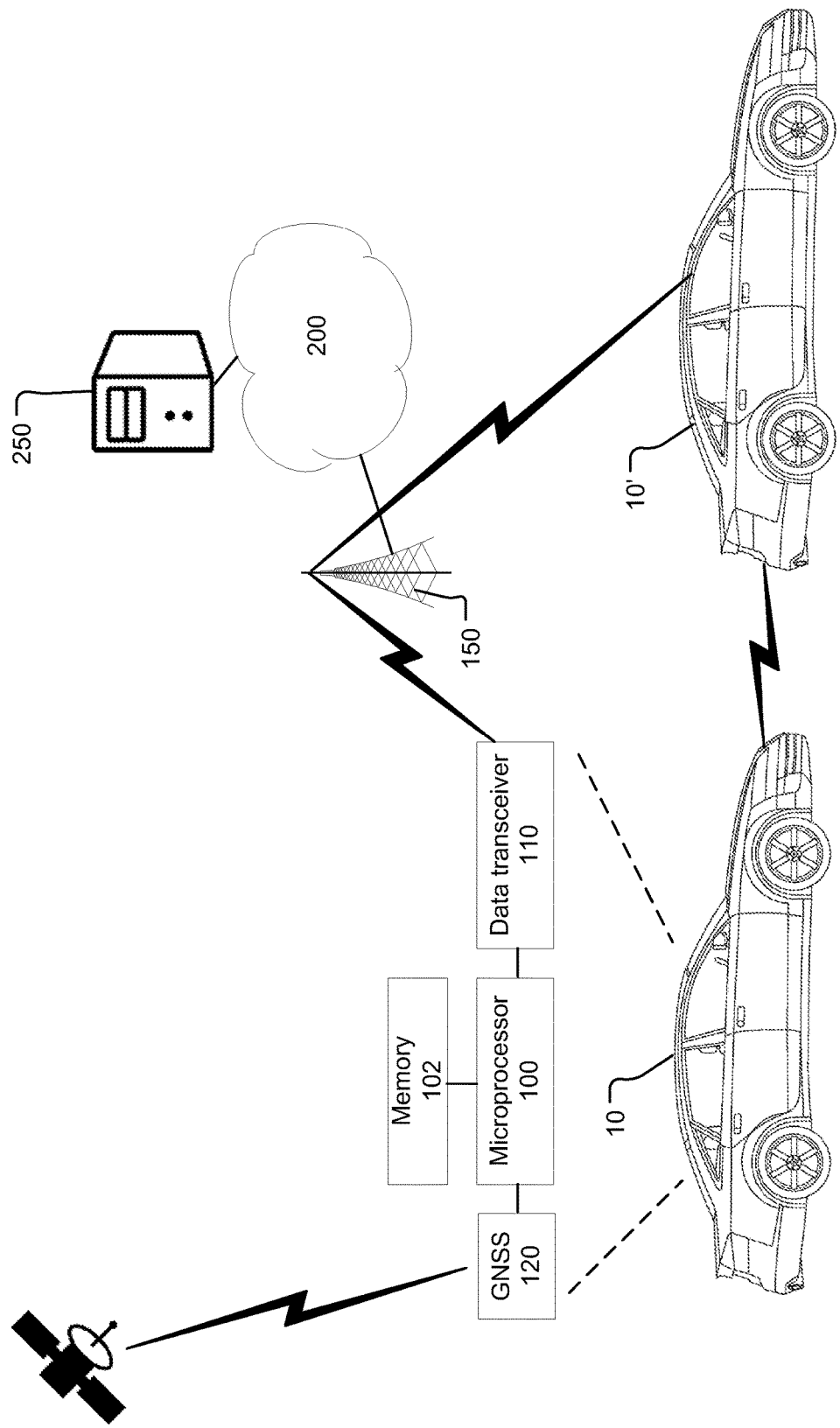
FIG. 7 illustrates a system including a first autonomous vehicle connected wirelessly to a second autonomous vehicle for providing road data from the first autonomous vehicle to the second autonomous vehicle to enable the second autonomous vehicle to pre-emptively adjust camber and/or caster.

FIG. 7 illustrates a system including a first autonomous vehicle 10' connected wirelessly to a second autonomous vehicle 10 for providing road data from the first autonomous vehicle 10' to the second autonomous vehicle 10 to enable the second autonomous vehicle 10 to pre-emptively adjust camber and/or caster. The road data may be shared via the server 250 or directly using a Vehicle-to-Vehicle (V2V) communication protocol. The vehicles 10, 10' may exchange V2V messages using IEEE 802.11p Dedicated Short-Range Communications (DSRC) in the 5.9 GHz band used, or to be used, by intelligent transportation systems (ITS). The DSRC messages are half duplex messages in the 5.850-5.925 GHz range and are short-range (approximately 300 m) and have a high data rate of 6-27 Mbps. The vehicles 10, 10' may also include a short-range data transceiver 110 such as a Wi-Fi® transceiver and/or a Bluetooth® transceiver for short-range data communication.

Figure 8:
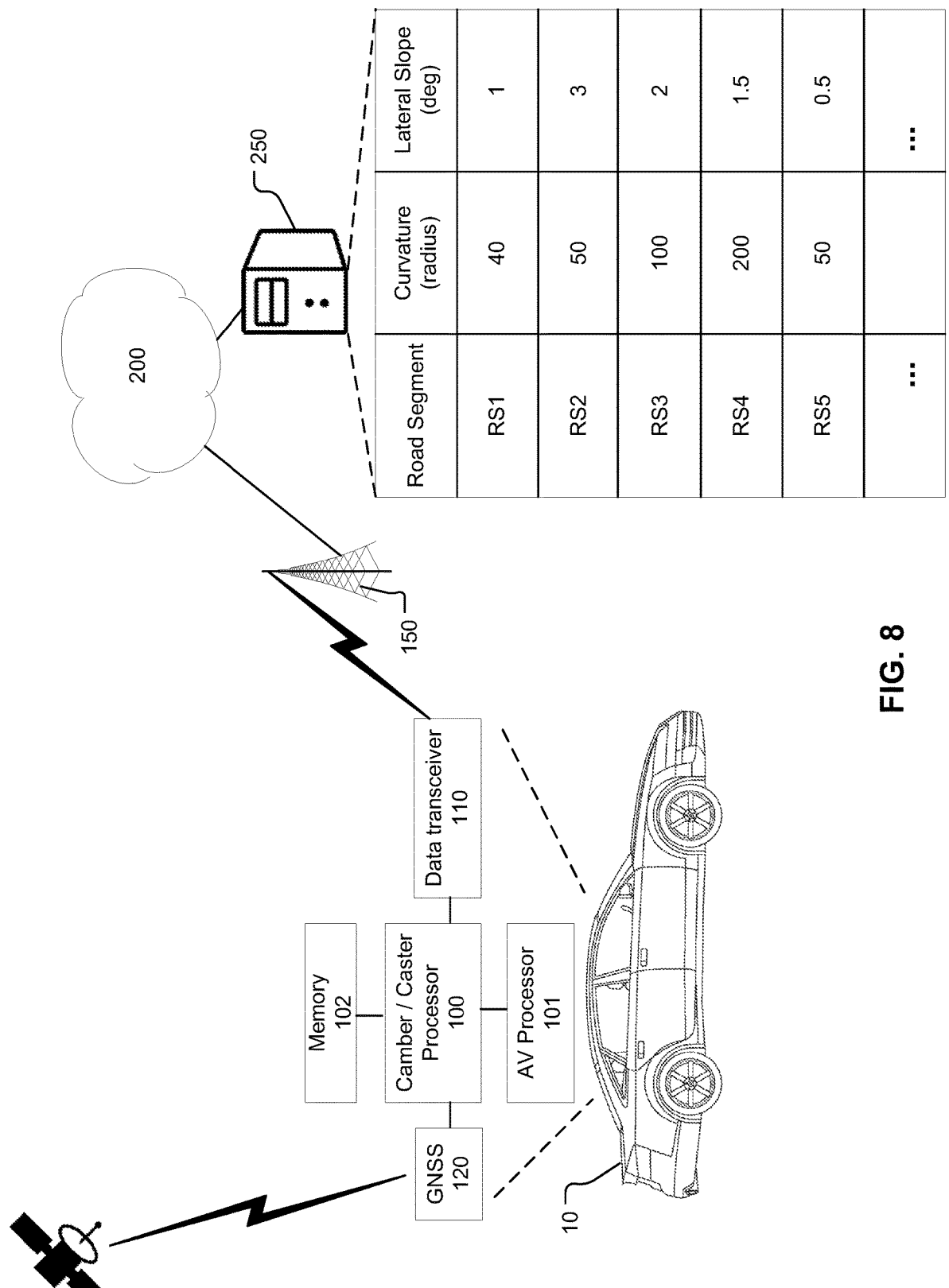
FIG. 8 illustrates a system in which the autonomous vehicle wirelessly receives road curvature and lateral slope data from a server to enable the autonomous vehicle to pre-emptively adjust camber and/or caster.

FIG. 8 illustrates a system in which the autonomous vehicle 10 wirelessly receives road curvature data and lateral slope data from the server 250 (via the internet 200 and the base transceiver station 150) to enable the autonomous vehicle 10 to pre-emptively adjust camber and/or caster. The road curvature data and the lateral road slope data may be provided for a plurality of road segments as shown by way of example in FIG. 8. In the example shown in FIG. 8, the autonomous vehicle 10 has a discrete camber/caster processor 100 and a separate autonomous driving processor 101. Alternatively, the camber/caster processor and autonomous driving processor may be combined into a single processor as shown for example in FIGS. 6 and 7.

Whether the autonomous vehicle has a discrete camber/caster processor or a combined camber/caster and autonomous driving processor, the processor 100 is configured to execute a vehicle dynamics prediction module 105 to predict forces on the wheels (i.e. the vehicle dynamics condition) and to output a control signal based on the vehicle dynamics condition. One control signal per wheel may be output in some embodiments. The control signal is used to control a respective wheel geometry adjustment mechanism connected to each of the respective wheels for automatically adjusting one or both of the camber angle and the caster angle of the respective wheel in response to the control signal. The wheel geometry adjustment mechanism may comprise in one embodiment both a camber adjustment actuator and a caster adjustment actuator. In another embodiment, the wheel geometry adjustment mechanism has only a camber adjustment actuator. In another embodiment, the wheel geometry adjustment mechanism has only a caster adjustment actuator.

In one embodiment, the plurality of wheels comprises a front left wheel, a front right wheel, a rear left wheel and a rear right wheel. In this embodiment, the vehicle dynamics prediction module 105 generates a first control signal for a first wheel geometry adjustment mechanism for the front left wheel, generates a second control signal for a second wheel geometry adjustment mechanism for a front right wheel, generates a third control signal for a third wheel geometry adjustment mechanism for a rear left wheel, and generates a fourth control signal for a fourth wheel geometry adjustment mechanism for a rear right wheel.

Figure 9:
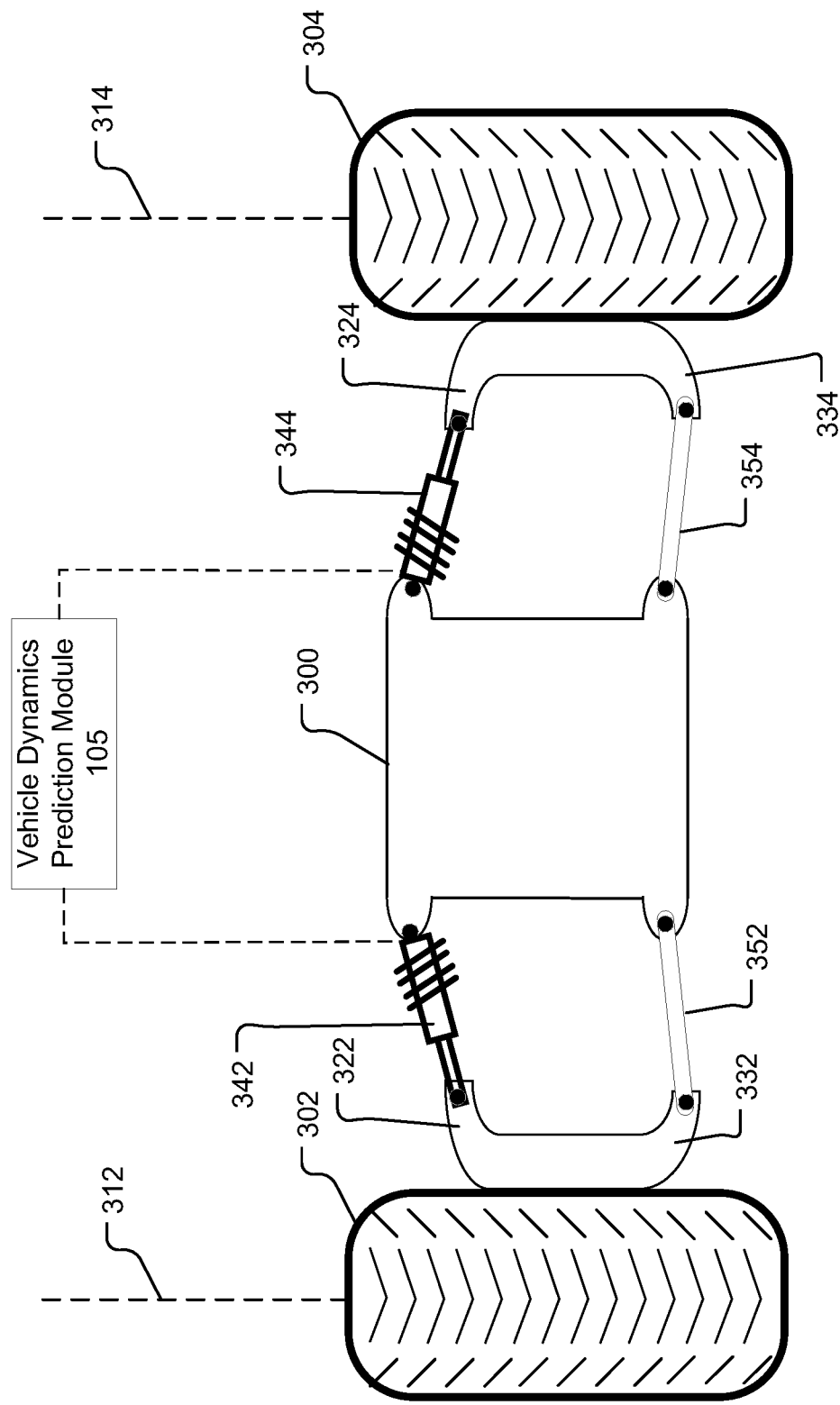
FIG. 9 depicts a camber adjustment mechanism having upper camber adjustment actuators for independently adjusting the camber of the wheels.

As depicted by way of example in FIG. 9, a plurality of wheels 302, 304 are rotationally mounted to a chassis 300 of an autonomous vehicle. Each wheel is characterized by a camber angle 312, 314. The vehicle dynamics prediction module 105 predicts a vehicle dynamics condition and generates a control signal based on the vehicle dynamics condition. A camber adjustment actuator 342, 344 associated with each wheel 302, 304 automatically adjusts the camber angle in response to the control signal. The actuators 342, 344 may be lockable linear hydraulic actuators configured to be unlocked in response to the control signal, adjusted by extension or retraction, and then re-locked when the target camber angle has been reached. The lockable linear hydraulic actuators 342, 344 may include a spring and a dampener for shock absorption. The actuators 342, 344 may be pneumatic or electric actuators in other embodiments. The actuators 342, 344 may be linear actuators or rotary actuators with, for example, a screw drive, cam, or other mechanism for converting rotary motion of the rotary actuators into a camber angle adjustment.

For example, the vehicle dynamics prediction module 105 may receive data from the vehicle navigation system indicating that the autonomous vehicle 10 is going to turn off the highway onto a sharply curving exit ramp at high speed. The vehicle dynamics prediction module 105 predicts that the upcoming turn onto the exit ramp will generate a predicted lateral g-force of 0.8. This g-force is the vehicle dynamics condition when cornering through the upcoming sharp turn. The vehicle dynamics prediction module 105 then will generate a control signal to cause the camber adjustment mechanism to increase the camber of one or more of the wheels by, e.g. 5%, 10%, 25%, or other suitable amount.

FIG. 9 depicts a camber adjustment mechanism having upper camber adjustment actuators 342, 344 for independently adjusting the camber of the wheels 302, 304. In the embodiment depicted in FIG. 9, the left wheel 302 is movably connected to the chassis 300 and defines a left wheel camber angle 312 relative to the chassis 300. Symmetrically, the right wheel 304 is movably connected to the chassis 300 and defines a right wheel camber angle 314 relative to the chassis 300. In this configuration, the left and right camber angles 312, 314 are both zero. The left camber adjustment actuator 342 is pivotally connected between the left upper control arm 322 and the chassis 300. The right camber adjustment actuator 344 is pivotally connected between the right upper control arm 324 and the chassis 300. A left lower link 352 pivotally interconnects the left lower control arm 332 and the chassis 300. A right lower link 354 pivotally interconnects the right lower control arm 334 and the chassis 300. In FIG. 9, the camber adjustment actuators 342, 344 are independently controllable to enable the processor to independently adjust the camber of each wheel on its own, i.e. independently of the other.

Figure 10:
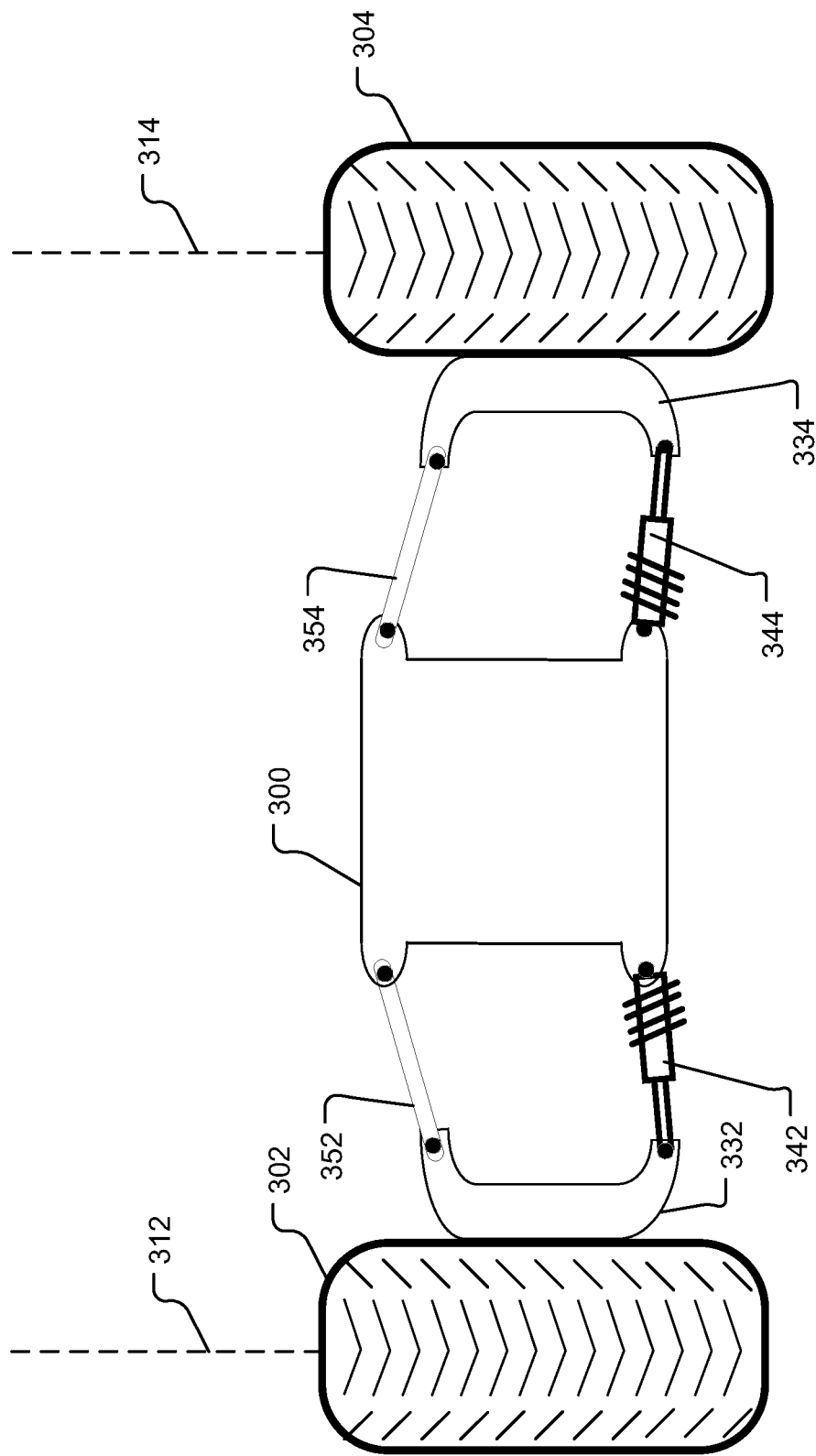
FIG. 10 depicts a camber adjustment mechanism having lower camber adjustment actuators for independently adjusting the camber of the wheels.

FIG. 10 depicts a camber adjustment mechanism having lower camber adjustment actuators for independently adjusting the camber of the wheels. The camber adjustment actuators 342, 344 are respectively connected to the lower control arms 332, 334 instead of to the upper control arms as shown in FIG. 9.

Figure 11:
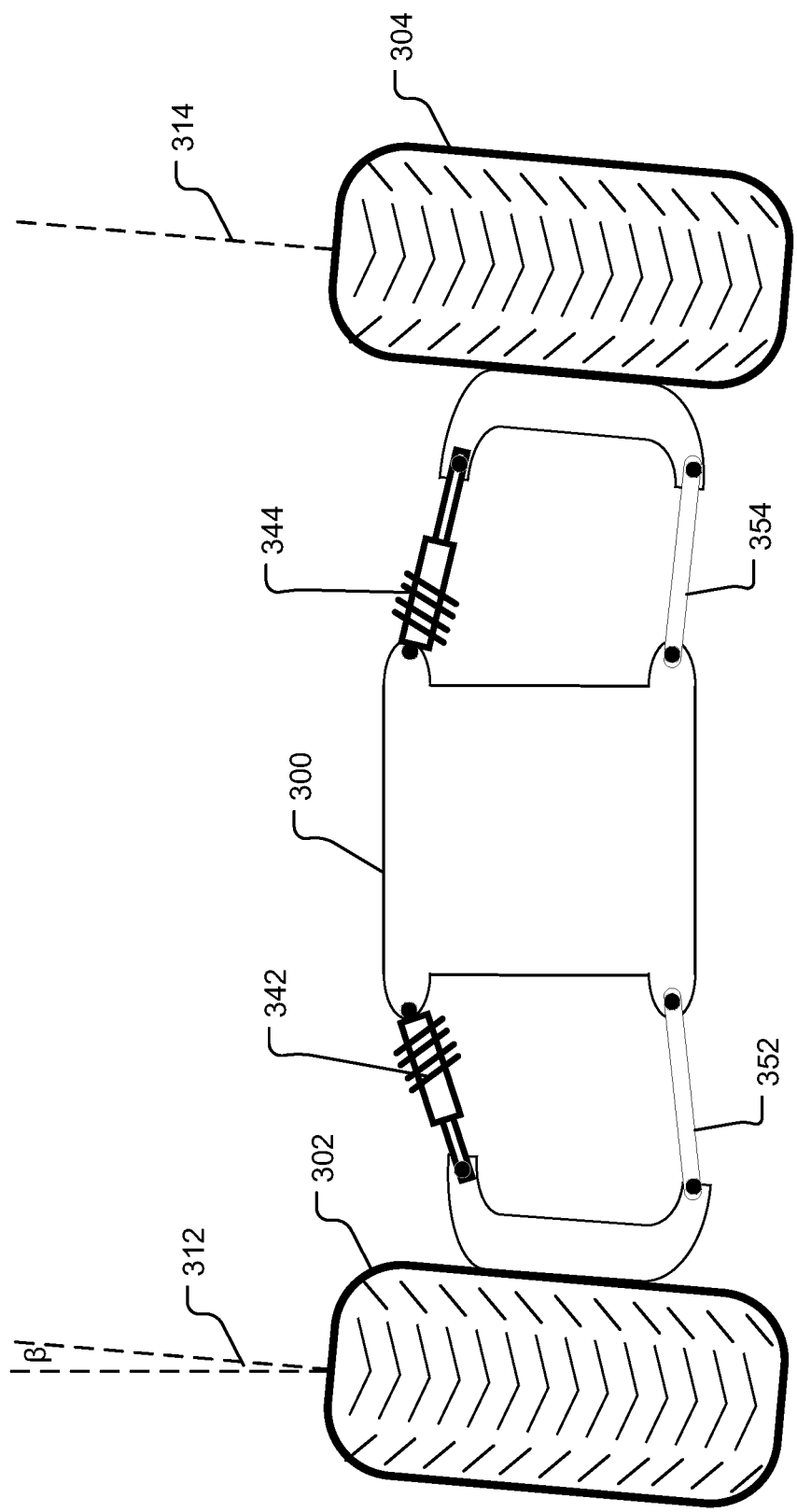
FIG. 11 depicts the camber adjustment mechanism of FIG. 9 providing negative camber to the left wheel and positive camber to the right wheel.

FIG. 11 depicts the camber adjustment mechanism of FIG. 9 providing negative camber to the left wheel 302 and positive camber to the right wheel 304. The left camber angle 312 and the right camber angle 314 are, in this figure, of equal magnitude such that the wheels are parallel as illustrated. The camber angle is denoted in this figure by B.

Figure 12:
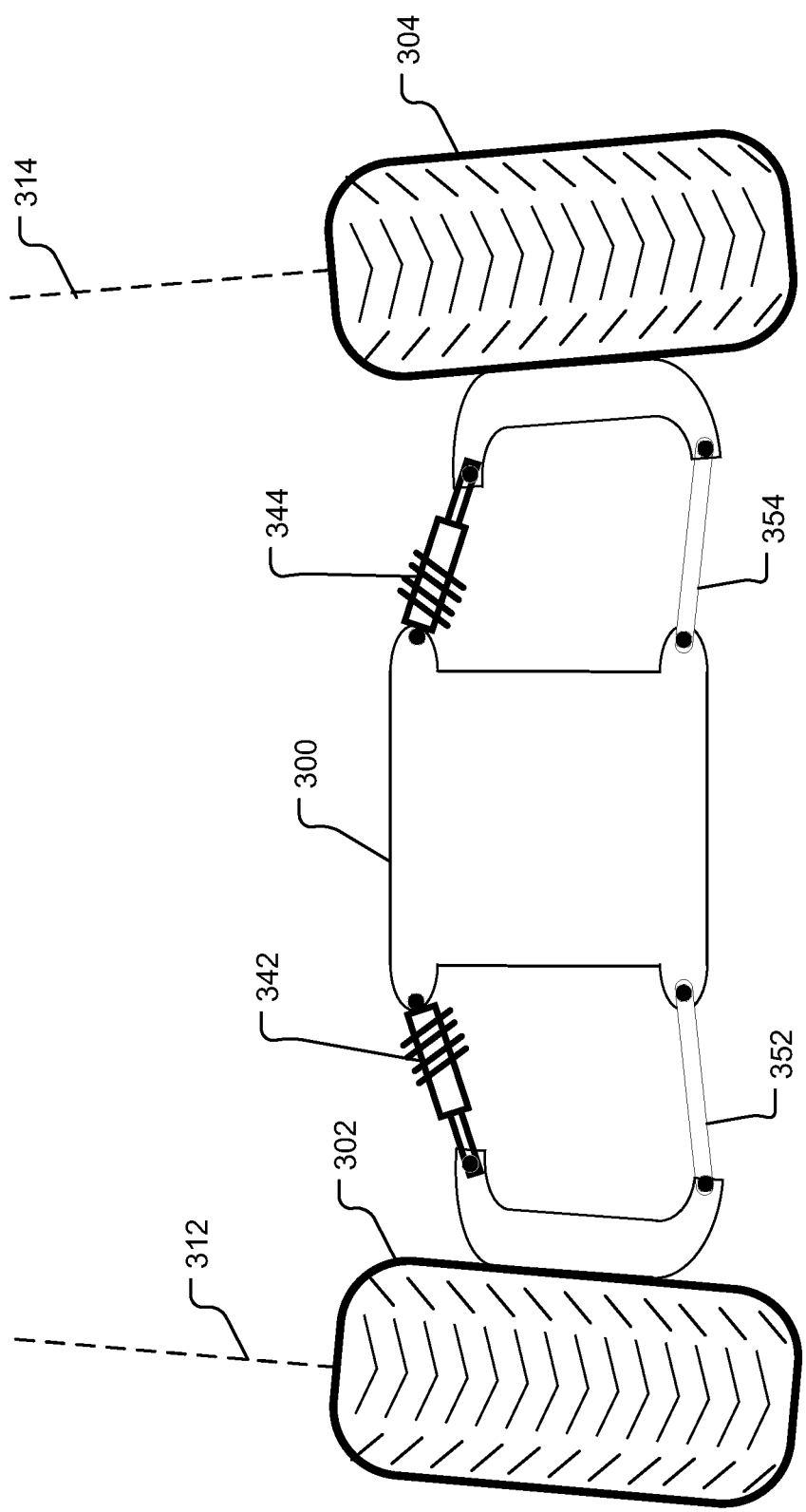
FIG. 12 depicts the camber adjustment mechanism of FIG. 9 providing negative camber to the left wheel and negative camber to the right wheel.

FIG. 12 depicts the camber adjustment mechanism of FIG. 9 providing negative camber to the left wheel 302 and negative camber to the right wheel 304. The left camber angle 312 and the right camber angle 314 are, in this figure, equal such that the wheels' geometry is symmetrical as illustrated.

Figure 13:
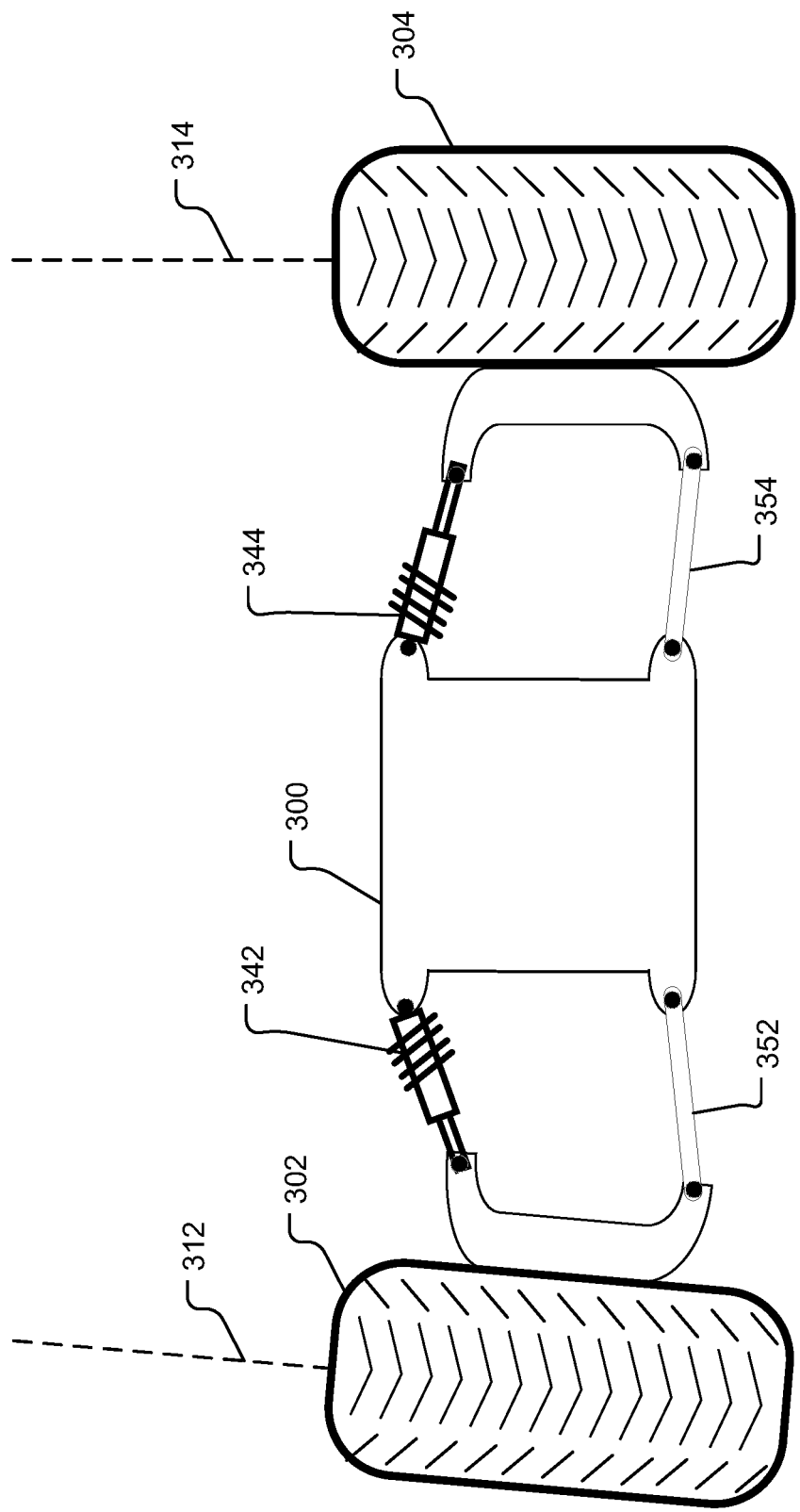
FIG. 13 depicts the camber adjustment mechanism of FIG. 9 providing negative camber to the left wheel and zero camber to the right wheel.

FIG. 13 depicts the camber adjustment mechanism of FIG. 9 providing negative camber to the left wheel 302 and zero camber to the right wheel 304. In this figure, the wheel geometry is asymmetrical. This figure also illustrates how one wheel can be adjusted to an optimized camber angle while the other wheel remains at zero camber (or a different absolute value of the camber angle).

Figure 14:
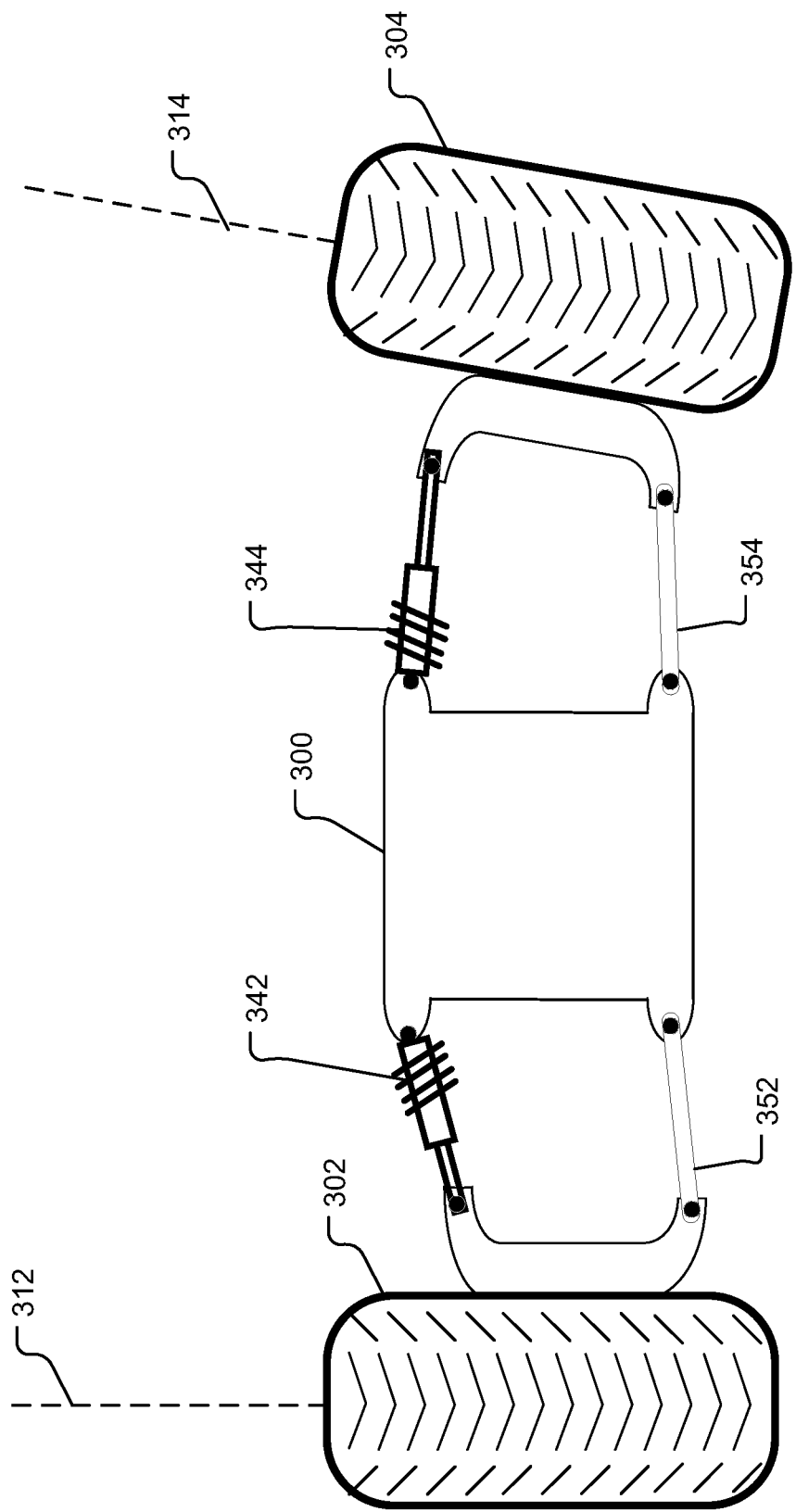
FIG. 14 depicts the camber adjustment mechanism of FIG. 9 providing zero camber to the left wheel and positive camber to the right wheel.

FIG. 14 depicts the camber adjustment mechanism of FIG. 9 providing zero camber to the left wheel 302 and positive camber to the right wheel 304.

The camber adjustment mechanisms can be used to preemptively adjust the camber of the wheels of the autonomous vehicle in order to optimized the vehicle's cornering performance. In some instances, the camber is adjusted to compensate for a laterally sloped portion of roadway over with the vehicle is traveling. For example, if the road is sloped laterally, the camber of one or more wheels can be adjusted to better match the lateral slope of the road.

Figure 15:
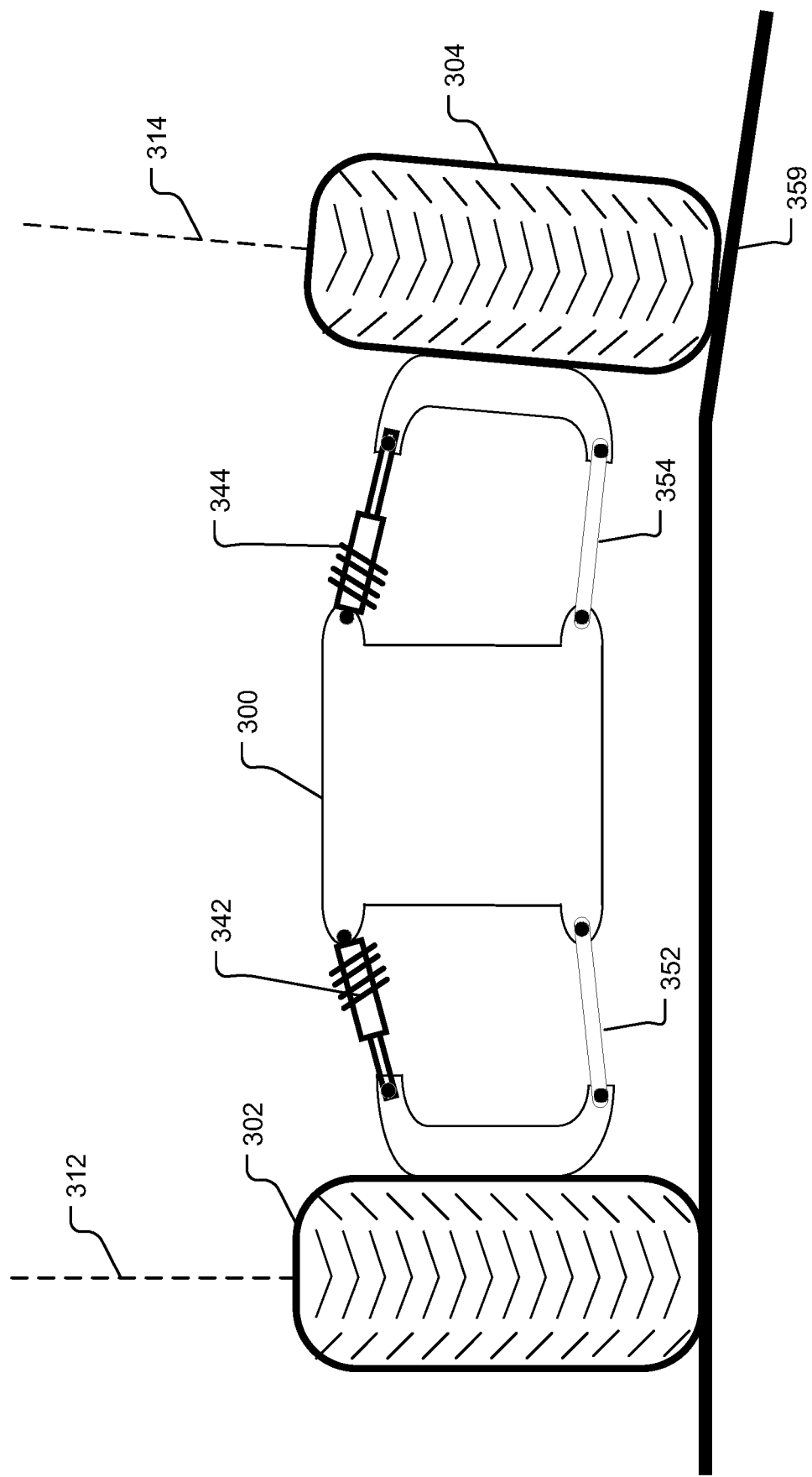
FIG. 15 depicts the camber adjustment mechanism of FIG. 9 providing zero camber to the left wheel and positive camber to the right wheel when the right wheel is on a laterally sloped portion of road.

FIG. 15 depicts the camber adjustment mechanism of FIG. 9 providing zero camber to the left wheel 302 and positive camber to the right wheel 304 when the right wheel is on a laterally sloped portion 359 of road.

Figure 16:
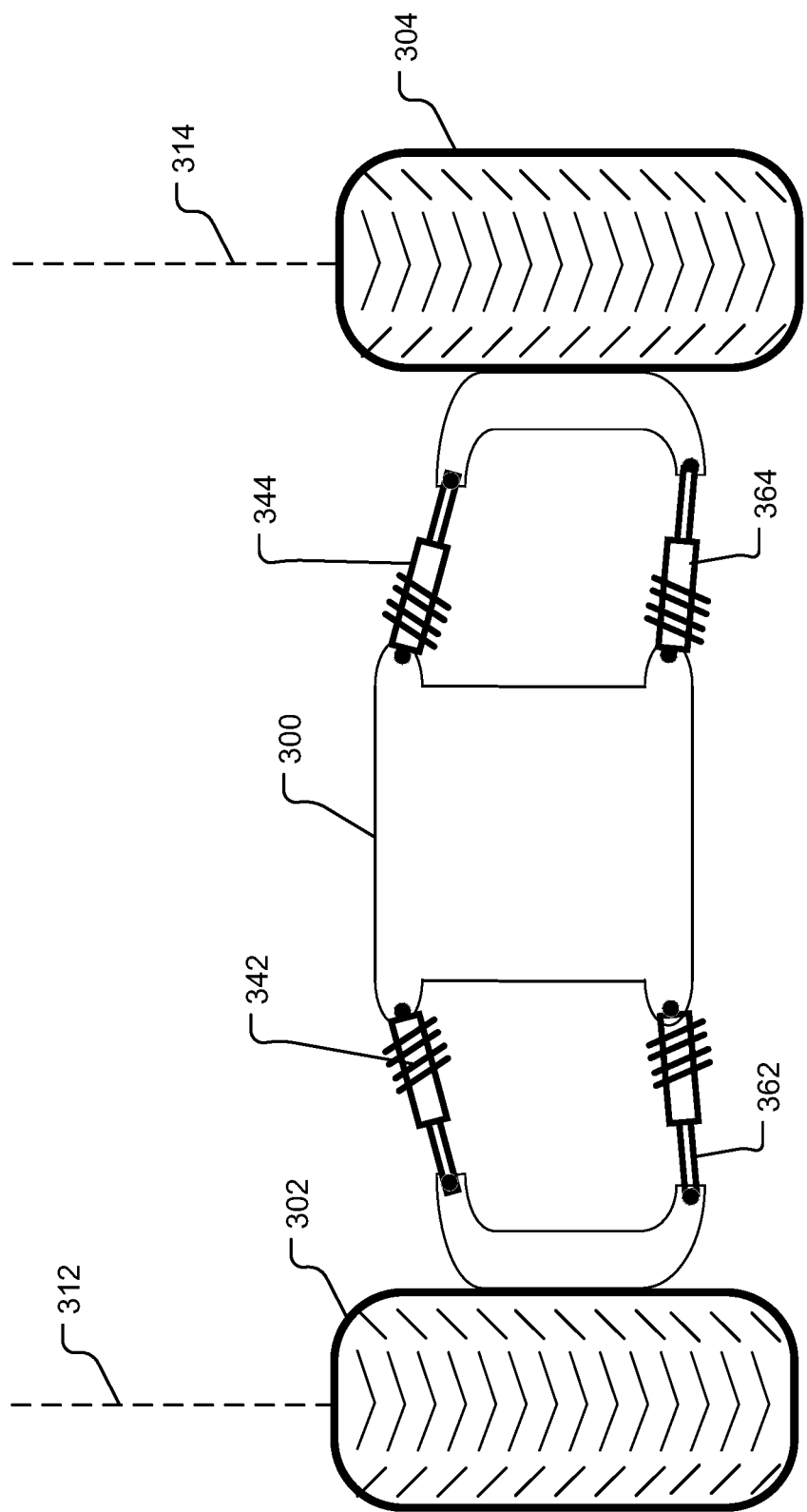
FIG. 16 depicts a camber adjustment mechanism having both upper camber adjustment actuators and lower camber adjustment actuators.

FIG. 16 depicts a camber adjustment mechanism having both upper camber adjustment actuators 342, 344 and lower camber adjustment actuators 362, 364. In this embodiment, the processor can simultaneously adjust all actuators 342, 344, 362, 364 to adjust the camber of the wheels. For example, to increase the negative camber of the left wheel 302, the upper left actuator 342 retracts while the lower left actuator 362 extends. In one implementation, the amount of retraction of the upper left actuator 342 is equal to the amount of extension of the lower left actuator 362. In another implementation, the amount of retraction of the upper left actuator 342 is unequal to the amount of extension of the lower left actuator 362.

The camber/caster adjustment mechanisms of FIGS. 9-16 may be adapted to the front steerable wheels and/or to the non-steerable rear wheels, whether these are drive wheels or not. The mechanisms may thus be used with front-wheel drive, rear-wheel, all-wheel drive or four-wheel drive vehicles. Although the above description refers to a typical road vehicle with four wheels, it will be appreciated that the inventive concepts may be adapted to vehicles with more than four wheels, e.g. to six-wheeled vehicles or eight-wheeled vehicles.

The camber mechanisms may alternatively incorporate suitably modified linkages or mechanisms of the types shown in U.S. Pat. Nos. 6,267,387 and 9,102,207, which are hereby incorporated by reference.

In one embodiment, the vehicle dynamics prediction module 105 receives and applies a user-specified drive mode from a plurality of user-selectable drive modes. The drive mode may be used by the vehicle dynamics prediction module 105 to further modify the camber angle. For example, a sport mode may be used by the vehicle dynamics prediction module 105 to increase negative camber for more aggressive cornering. An economy ("eco") mode may be used by the vehicle dynamics prediction module 105 to position the wheels at zero camber.

In another embodiment, the autonomous vehicle 10 may have a camber master selector to switch between an automatic camber adjustment mode and a manual camber adjustment mode. In the automatic camber adjustment mode, the vehicle dynamics prediction module 105 automatically adjusts camber as described above. In the manual camber adjustment mode, the user can select the camber angle. The autonomous vehicle 10 in the manual camber adjustment mode displays on a vehicle display (e.g. dashboard display) a camber adjustment interface element that is user-selectable to receive user input (driver input) to adjust the camber angle. The dashboard display may also graphically or pictorially show a representation of the autonomous vehicle and its wheels with the changed camber so the user (driver) can see how much camber is applied to the wheels while sitting inside the vehicle. Likewise, when operating in the automatic camber adjustment mode, the vehicle dynamics prediction module 105 may be configured to output a display signal to the vehicle display to display camber information, thereby showing the driver how the wheel camber is changing while cornering. In a variant, the vehicle display may present an enlarged view of the wheel and/or a slow-motion animation of the changing camber. The camber information may include a numerical value indicating the angle in degrees and an indication of whether the camber angle is positive (+) or negative (−) or zero. The camber information may include a graphical or pictorial representation of the wheel and tire showing the camber angle. The vehicle display may enable the user to rotate and/or zoom the graphical or pictorial representation to view the wheel and tire and/or the vehicle from different perspectives and/or different scales or zoom levels. The vehicle display also displays a camber adjustment interface element that is user-selectable to receive user input to adjust the camber angle. The caster adjustment interface element may be a virtual touch screen button or group of buttons, or plus (+) and minus (−) buttons, a rotatable knob, or any other suitable input device.

In another aspect, the autonomous vehicle comprises a chassis and a plurality of wheels rotationally mounted to the chassis, wherein each wheel is characterized by a caster angle. The vehicle includes a vehicle dynamics prediction module for predicting a vehicle dynamics condition and for generating a control signal based on the vehicle dynamics condition. The vehicle includes a caster adjustment actuator for automatically adjusting the caster angle in response to the control signal.

Figure 17:
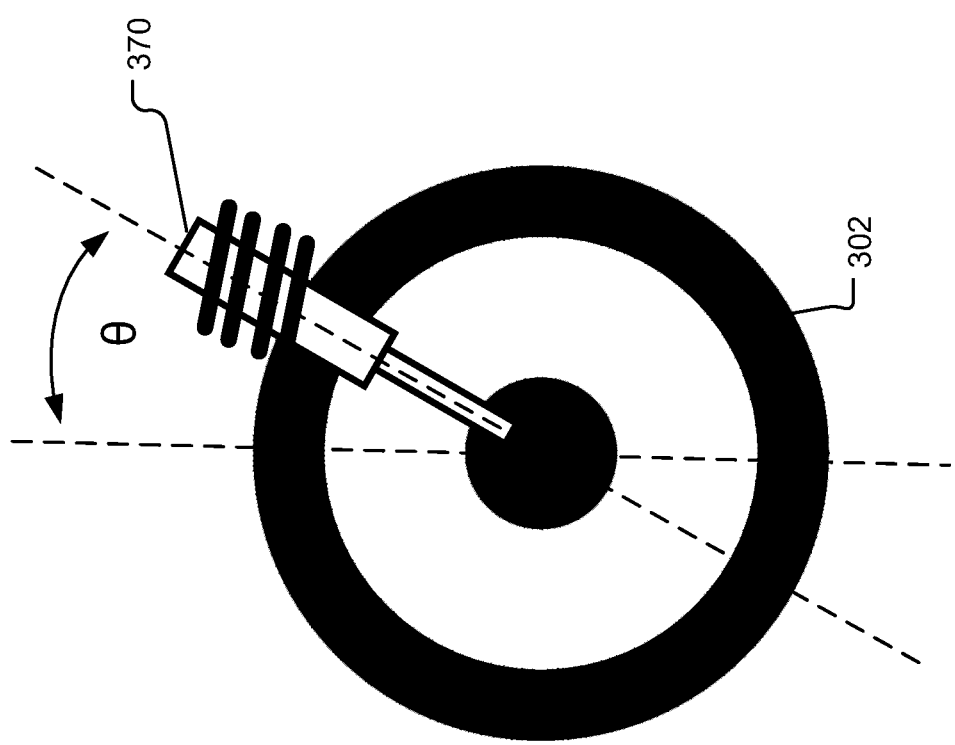
FIG. 17 is a simplified depiction of a wheel with a wheel suspension mechanism, showing the caster angle.

FIG. 17 is a simplified depiction of a wheel 302 with a wheel suspension mechanism 370, showing the caster angle θ.

Figure 18:
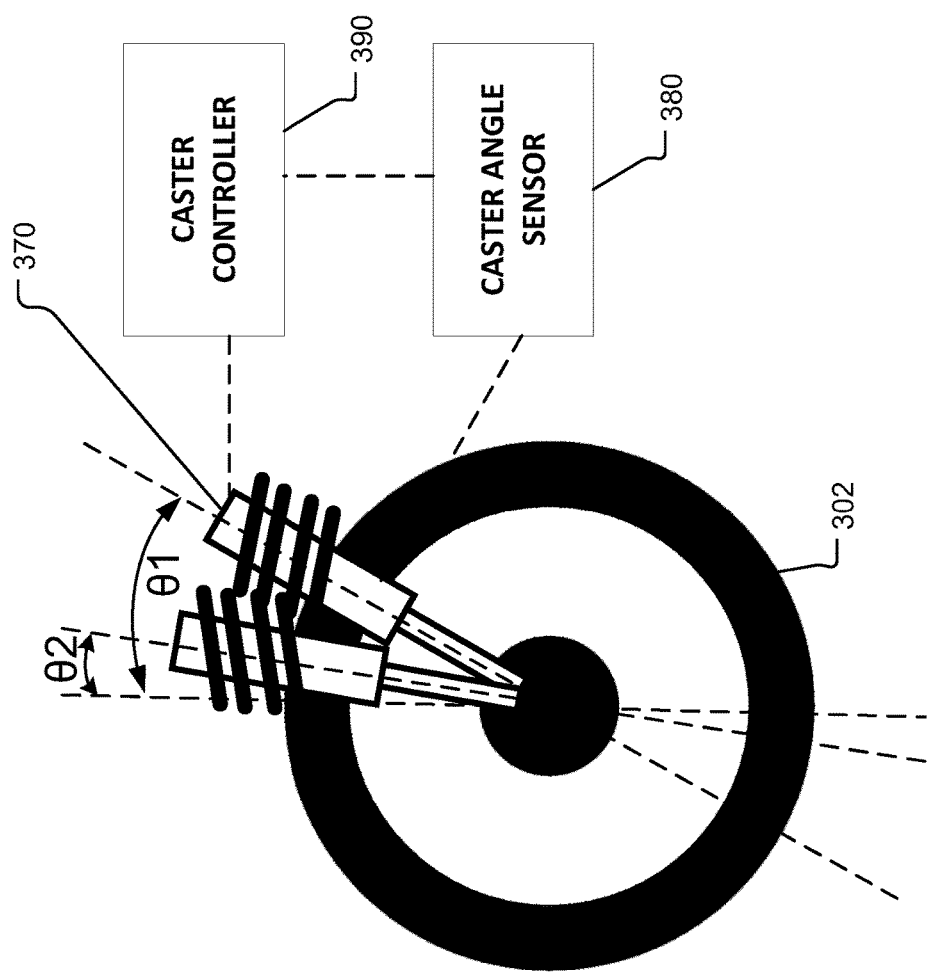
FIG. 18 is a schematic depiction of a caster angle adjustment system having a caster angle sensor and a caster controller to adjust the caster angle of the wheel.

FIG. 18 is a schematic depiction of a caster angle adjustment system having a caster angle sensor 380 and a caster controller 390 to adjust the caster angle of the wheel. In the embodiment of FIG. 18, the caster controller 390 provides a control signal to adjust the caster angle of the wheel suspension mechanism 370 from a first caster angle θ1 to a second caster angle θ2. The caster angle sensor 380 detects the caster angle and then provides a feedback signal to the caster controller 390 to adjust the caster angle. In operation, the caster controller receives caster angle readings from the caster angle sensor. The processor sends a caster angle control signal to the caster controller to change the caster angle from a first caster angle θ1 to a second (target) caster angle θ2. An actuation mechanism controlled by the caster controller moves the wheel suspension mechanism 370 until the caster angle sensor 380 detects that the caster angle has reached the target caster angle θ2. The caster controller 390 then signals the actuation mechanism to stop moving the wheel suspension mechanism 370.

Figure 19:
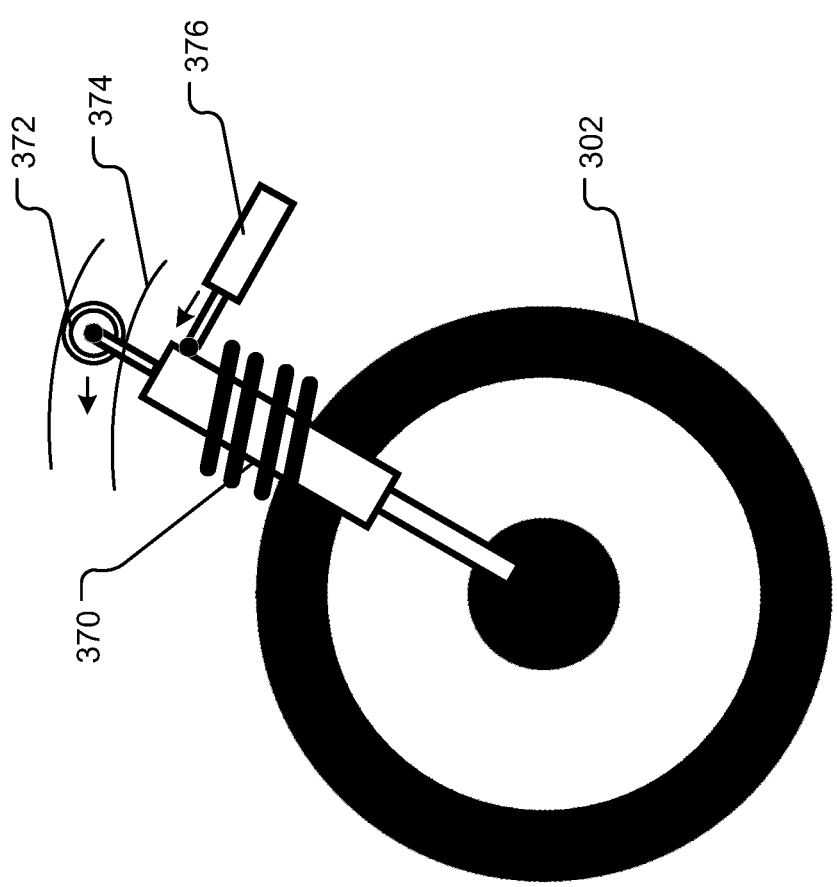
FIG. 19 is a schematic depiction of a caster adjustment actuator.

FIG. 19 is a schematic depiction of a caster adjustment actuator as an example implementation of the actuation mechanism. The actuation mechanism for moving the wheel suspension mechanism 370 comprises a roller 372 that is configured to roll through a slot 374. The roller 372 is rotationally mounted to the wheel suspension mechanism 370. A caster adjustment actuator 376 is connected to the wheel suspension mechanism 370 to displace the wheel suspension mechanism 370 to thereby change the caster angle. Other suitable or equivalent mechanisms may be used to vary the caster angle.

In another embodiment, the autonomous vehicle 10 may have a caster master selector to switch between an automatic caster adjustment mode and a manual caster adjustment mode. In the automatic caster adjustment mode, the vehicle dynamics prediction module 105 automatically adjusts caster as described above. In the manual caster adjustment mode, the user can select the caster angle. The autonomous vehicle 10 in the manual caster adjustment mode displays on a vehicle display (e.g. dashboard display) a caster adjustment interface element that is user-selectable to receive user input (driver input) to adjust the caster angle. In one embodiment, the vehicle dynamics prediction module 105 receives and applies a user-specified drive mode from a plurality of user-selectable drive modes to modify the caster angle. In one embodiment, the drive mode may be selected from one of the following: eco mode, normal mode, sport mode. The caster angle may also be adjusted automatically as a function of vehicle speed or pre-emptively based on expected vehicle speed.

The vehicle dynamics prediction module 105 may be configured to output a display signal to a vehicle display to display caster information. The caster information may include a numerical value indicating the angle in degrees and an indication of whether the caster angle is positive (+) or negative (−) or zero. The caster information may include a graphical or pictorial representation of the wheel and tire showing the caster angle. The vehicle display may enable the user to rotate and/or zoom the graphical or pictorial representation to view the wheel and tire and/or the vehicle from different perspectives and/or different scales or zoom levels. The vehicle display also displays a caster adjustment interface element that is user-selectable to receive user input to adjust the caster angle. The caster adjustment interface element may be a virtual touch screen button or group of buttons, or plus (+) and minus (−) buttons, a rotatable knob, or any other suitable input device.

In one embodiment, the autonomous vehicle 10 is able to adjust both camber and caster simultaneously. For example, the vehicle dynamics prediction module 105 may transmit control signals to a camber adjustment actuator and to a caster adjustment actuator, either simultaneously or sequentially, to cause contemporaneous adjustment of both camber and caster for a particular wheel.

Figure 20:
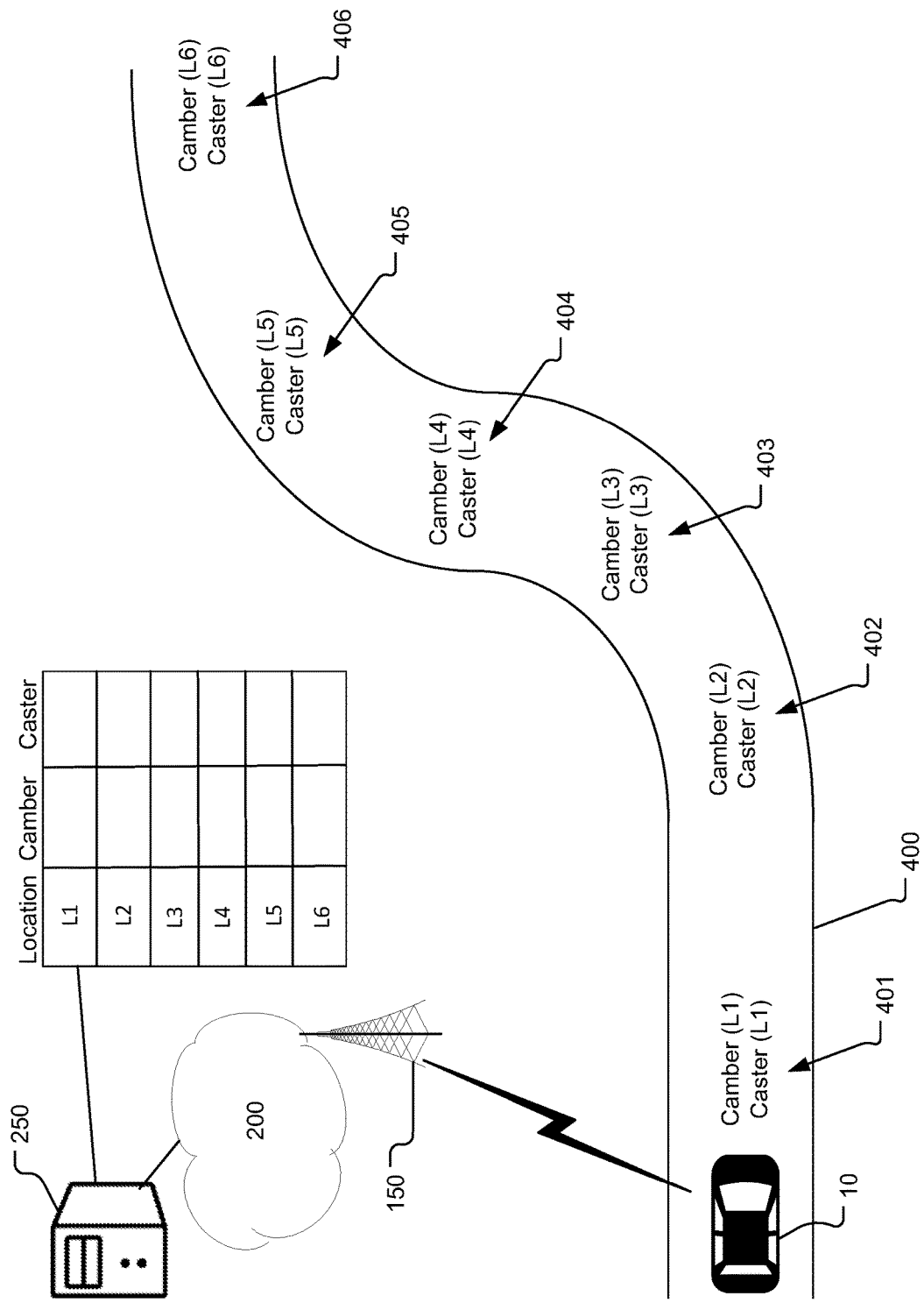
FIG. 20 is a schematic depiction of an autonomous vehicle obtaining road curvature data from a server to determine vehicle dynamics conditions at each turn to thereby enable the autonomous vehicle to pre-emptively control wheel camber and caster for each turn.

FIG. 20 is a schematic depiction of an autonomous vehicle 10 determining, collecting and delivering camber and caster angle data to the server 250. At each location along the road (i.e. locations L1, L2, L3, L4, L5 and L6), the autonomous vehicle 10 determines camber and/or caster angles based on the vehicle dynamics conditions that are either predicted or alternatively actually measured using accelerometers. The camber and caster angles are transmitted along with location coordinates to the server 250 which then stores the data for analysis, dynamic model refinement and/or sharing with other autonomous vehicles 10.

The server 250 may be configured to collect data from a plurality of vehicles over a period of time to enable the server 250 (or other servers networked thereto) to refine the dynamic model that relates wheel forces to camber and caster angles. The server may then deliver a refined dynamic model to the vehicle dynamics prediction module 105 to refine and improve the determination of camber and caster angles based on expected vehicle dynamics. As such, the server 250 can be configured to continually refine the dynamic model based on data received from a large number of autonomous vehicles over time. The server 250 can be configured to develop type-specific dynamic models, i.e. a dynamic model that is customized for a particular type (make and model) of vehicle. The server 250 can be further configured to develop tire-specific dynamic models that are customized for specific wheel sizes and/or tire types and/or tire inflation pressures. The server 250 can periodically or occasionally provide software updates to the vehicle dynamics prediction module 105 to refine the dynamic model that is used to predict the optimized camber and caster for particular dynamic conditions.

In another embodiment, the autonomous vehicle 10 may retrieve pre-computed camber and caster data by requesting and downloading the data from the server 250. The request may specify the model or type of autonomous vehicle to enable type-specific data to be downloaded from the server 250. In one embodiment, the autonomous vehicle 10 may retrieve pre-computed camber data and then determine an appropriate caster value based on the camber data or vice versa (i.e. determine an appropriate camber value based on the caster data). The server 250 in this embodiment is configured to collect over time vehicle dynamics condition data from vehicles traveling over the same portion of roadway and to store recommended caster and camber angles for the various portions of the roadway. The server may also compute average or nominal camber and caster data for each vehicle type and for each range of speeds. On request, the server can transmit camber and caster data to a vehicle that is about to travel over this same portion of roadway. The vehicle receiving the data can use this pre-computed data without computing its own camber or caster angles. Alternatively, the vehicle can use the data as a check to ensure that its own on-the-fly computations are within a predetermined acceptable range of the precomputed angles. Whether used exclusively for camber/caster adjustment or only as a check, the pre-computed camber and caster data for specific locations L1-L6 enable the autonomous vehicle 10 to pre-emptively control wheel camber and caster for each turn along the road 400 shown in FIG. 20. In a variant, the autonomous vehicle 10 controls only camber. In a variant, the autonomous vehicle 10 controls only caster. The autonomous vehicle 10 may control the camber and/or caster of one, two, three or all four wheels.

In another embodiment, the autonomous vehicle 10 also uses sensors (e.g. accelerometers) to measure the actual forces acting on the vehicle when cornering. This measured force data can then be compared after each turn with the expected (predicted) forces to refine the dynamic model used by the vehicle dynamics prediction module 105. The refinement of the dynamic model made by done by the vehicle dynamics prediction module 105 or it may be done by the server 250.

In some embodiments, the vehicle dynamics prediction module 105 receives location data from a positioning system to determine a vehicle path, and also determines the vehicle weight and weight distribution, as well as the road slope where the vehicle will be cornering. In a variant, the vehicle dynamics prediction module 105 also takes into account wind speed and wind direction and the resulting aerodynamic effect acting on the wheels of the vehicle. The vehicle dynamics prediction module 105 can then compute the expected roll of the vehicle at the turn and the resultant cornering forces (i.e. the vehicle dynamics condition) acting on each wheel during the turn. The vehicle dynamics condition enables calculation of optimized camber and caster angles by the vehicle dynamics prediction module 105.

In some embodiments, the vehicle dynamics prediction module receives and uses roadway conditions to predict the vehicle dynamics condition. The roadway conditions may include lateral road slope as noted above. Lateral road slope is the slope or inclination of the roadway in a direction orthogonal to the direction of travel. In addition, the roadway conditions may include the expected slipperiness of the road based on the weather or road surface conditions (wet, dry, snow-covered, ice-covered, gravel, rough pavement, smooth pavement). The expected slipperiness of the road can be used by the vehicle dynamics prediction module 105 to predict lateral slippage and thus to adjust the camber angle accordingly to minimize lateral slippage during the turn.

In one embodiment, the vehicle dynamics prediction module also receives and uses tire pressures for tires of each wheel to predict the vehicle dynamics condition as modified by the tire pressure. In this embodiment, the force acting on each wheel is modified by the tire pressure to determine a pressure-specific adjustment to be applied to the caster angle and/or camber angle.

The vehicle dynamics prediction module 105, in one embodiment, predicts a transient lateral force profile for each wheel and sends signals to each respective wheel geometry adjustment mechanism providing a wheel-specific time-varying geometry for dynamically adjusting wheel geometry during cornering. The transient lateral force prolife may for example be expressed as force as a function of time or force as a function of distance (or position). In one specific embodiment, the vehicle dynamics prediction module 105 can be configured to predict a turn profile (with a time-varying radius of curvature) and to consequently predict a transient lateral force profile for each wheel. The vehicle dynamics prediction module 105 then transmits control signals to each respective camber adjustment actuator providing a wheel-specific time-varying camber angle $\beta(t)$ for dynamically adjusting the camber angle during cornering. Force sensors or accelerometers may be used to collect actual force or acceleration measurements during cornering in order to refine the transient force profile modeling used by the vehicle dynamics prediction module 105.

In one embodiment, the autonomous vehicle 10 stores or receives a camber-caster correlation, e.g. a mathematical relation, model, formula, equation, or table to enable the vehicle to determine a camber value based on a caster value or, conversely, to determine a caster value based on a camber value. For example, the vehicle may receive a user input setting a camber value. The vehicle in response to the user input computes a corresponding caster value based on the camber value specified by the user. As another example, the vehicle may compute a camber value based on a user-specified caster value. A vehicle graphical display may present to the user the ranges of recommended caster values for a user-specified camber value or the ranges of recommended camber values for a user-specified caster value. The vehicle graphical display may also display vehicle performance data associated with each camber-caster setting, e.g. fuel economy (or battery range), lateral g-force (when cornering), braking distance, acceleration, and/or tire tread wear.

In another embodiment, the vehicle graphical display may display a driving simulation (optionally with steering wheel haptics or force-feedback) to enable the user to experience a simulation of driving the vehicle with user-selected camber and caster settings to feel what the user-selected camber/caster settings are like, e.g. when cornering, accelerating, braking, etc.

Another aspect of the invention is a method of dynamically adjusting the camber of a wheel or wheels of an autonomous vehicle. The method entails executing by a processor a vehicle dynamics prediction module to predict forces on the wheel or wheels (i.e. the vehicle dynamics condition). The method involves outputting a control signal based on the vehicle dynamics condition, e.g. the predicted force or forces on the wheel or wheels. One control signal per wheel may be output in some embodiments. The method further involves controlling a respective wheel geometry adjustment mechanism connected to each of the respective wheels for automatically adjusting the camber angle of the respective wheel in response to the control signal. For example, in one implementation, the vehicle dynamics module sets the camber to zero to maximize acceleration and/or to maximize braking and then sets the camber to non-zero for cornering. Thus, the camber is adjusted dynamically by the autonomous vehicle to improve performance.

Another aspect of the invention is a method of dynamically adjusting the caster of a wheel of an autonomous vehicle. The method entails executing by a processor a vehicle dynamics prediction module to predict forces on the wheel or wheels (i.e. the vehicle dynamics condition). The method involves outputting a control signal based on the vehicle dynamics condition, e.g. the predicted force or forces on the wheel or wheels. One control signal per wheel may be output in some embodiments. The method further involves controlling a respective wheel geometry adjustment mechanism connected to each of the respective wheels for automatically adjusting the caster angle of the respective wheel in response to the control signal.

Another aspect of the invention is a method of dynamically adjusting both the caster and the camber of a wheel of an autonomous vehicle. The method entails executing by a processor a vehicle dynamics prediction module to predict forces on the wheel or wheels (i.e. the vehicle dynamics condition) and outputting a control signal based on the vehicle dynamics condition, e.g. the predicted force or forces on the wheel or wheels. The method further involves controlling a respective wheel geometry adjustment mechanism connected to each of the respective wheels for automatically adjusting both the caster and the camber of the respective wheel in response to the control signal.

These methods can be implemented in hardware, software, firmware or as any suitable combination thereof. That is, if implemented as software, the computer-readable medium comprises instructions in code which when loaded into memory and executed on a processor of a tablet or mobile device causes the tablet or mobile device to perform any of the foregoing method steps. These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. An autonomous vehicle comprising:
a chassis;
a plurality of wheels rotationally mounted to the chassis, wherein each wheel is characterized by a camber angle and a caster angle;
a Global Navigation Satellite System (GNSS) receiver to determine a current location of the autonomous vehicle;
a vehicle navigation system cooperating with the GNSS receiver to provide a route for the autonomous vehicle;
a processor executing a vehicle dynamics prediction module that is configured to identify a curve that the autonomous vehicle is approaching along the route, to determine a predicted speed at the curve, and to determine a turn profile of the curve, the turn profile being characterized by a varying radius of curvature, to predict a vehicle dynamics condition that includes an expected cornering force to be encountered at the curve based on the predicted speed at the curve and the varying radius of curvature of the turn profile, and to generate a control signal based on the vehicle dynamics condition that is predicted to occur at the curve, wherein the vehicle dynamics prediction module predicts a transient lateral force profile based on the varying radius of curvature of the curve and the predicted speed of the autonomous vehicle at the curve, and determines a time-varying geometry for dynamically adjusting wheel geometry through the curve; and
a wheel geometry adjustment mechanism connected to each of the wheels for automatically and pre-emptively adjusting one or both of the camber angle and the caster angle in response to the control signal such that the one or both of the camber angle and the caster angle is adjusted prior to the autonomous vehicle reaching the curve, wherein the wheel geometry is also dynamically adjusted through the curve in accordance with the time-varying geometry.

2. The autonomous vehicle of claim 1 wherein the plurality of wheels comprises a front left wheel, a front right wheel, a rear left wheel and a rear right wheel, and wherein the vehicle dynamics prediction module generates a first control signal for a first wheel geometry adjustment mechanism for the front left wheel, generates a second control signal for a second wheel geometry adjustment mechanism for a front right wheel, generates a third control signal for a third wheel geometry adjustment mechanism for a rear left wheel, and generates a fourth control signal for a fourth wheel geometry adjustment mechanism for a rear right wheel, wherein the vehicle dynamics prediction module predicts a first, second, third and fourth transient lateral force profile for the first, second, third and fourth wheels, respectively, based on the varying radius of curvature of the curve and the predicted speed of the autonomous vehicle at the curve, and sends first, second, third and fourth control signals to each respective wheel geometry adjustment mechanism providing a respective wheel-specific time-varying geometry for dynamically adjusting wheel geometry during cornering.

3. The autonomous vehicle of claim 1 wherein the wheel geometry adjustment mechanism comprises a camber adjustment actuator and a caster adjustment actuator, and wherein the autonomous vehicle stores a camber-caster correlation to enable the autonomous vehicle to determine a camber value based on a caster value or, conversely, to determine a caster value based on a camber value.

4. The autonomous vehicle of claim 1 wherein the processor also receives and uses lateral road slope data of a slope of a road in a direction perpendicular to a direction of travel to adjust the one or both of the camber angle and the caster angle.

5. The autonomous vehicle of claim 4 comprising a radiofrequency transceiver to download the lateral road slope data from a server.

6. The autonomous vehicle of claim 4 comprising a radiofrequency transceiver to download from a server recommended caster and camber angles for various portions of the route, wherein the recommended caster and camber angles are determined by the server based on a type of vehicle and a type of tire.

7. The autonomous vehicle of claim 6 wherein the radiofrequency transceiver transmits camber and caster data computed by the vehicle dynamics prediction module to the server for sharing with other vehicles.

8. The autonomous vehicle of claim 1 wherein the vehicle dynamics prediction module predicts the transient lateral force profile for each wheel and sends control signals to each respective wheel geometry adjustment mechanism providing a wheel-specific time-varying geometry for dynamically adjusting the wheel geometry of each wheel during cornering.

9. The autonomous vehicle of claim 1 wherein the vehicle dynamics prediction module also uses a weight distribution of the autonomous vehicle to predict the vehicle dynamics condition.

10. The autonomous vehicle of claim 1 further comprising a camber master selector to switch between an automatic camber adjustment mode and a manual camber adjustment mode, wherein the vehicle dynamics prediction module automatically adjusts the camber angle in the automatic camber adjustment mode and a user can select a camber angle in the manual camber adjustment.

11. An autonomous vehicle comprising:
a chassis;
a plurality of wheels rotationally mounted to the chassis, wherein each wheel is characterized by a camber angle;
a Global Navigation Satellite System (GNSS) receiver to determine a current location of the autonomous vehicle;
a vehicle navigation system cooperating with the GNSS receiver to provide a route for the autonomous vehicle;
a processor executing a vehicle dynamics prediction module that is configured to identify a curve that the autonomous vehicle is approaching along the route, to determine a predicted speed at the curve, and to determine a turn profile of the curve, the turn profile being characterized by a varying radius of curvature, to predict a vehicle dynamics condition characterized by an expected cornering force on each wheel based on the predicted speed at the curve and the varying radius of curvature of the turn profile, and to generate a control signal for each based on the vehicle dynamics condition, wherein the vehicle dynamics prediction module predicts a transient lateral force profile based on the varying radius of curvature of the curve and the predicted speed of the autonomous vehicle at the curve, and determines a time-varying camber angle for dynamically adjusting the camber angle through the curve; and
a camber adjustment actuator for each wheel for automatically adjusting the camber angle of each wheel in response to the control signal, wherein the camber angle is dynamically adjusted through the curve in accordance with the time-varying camber angle.

12. The autonomous vehicle of claim 11 wherein the vehicle dynamics prediction module receives and applies a user-specified drive mode from a plurality of user-selectable drive modes to modify the camber angle, wherein the autonomous vehicle stores a camber-caster correlation to enable the autonomous vehicle to determine a caster angle based on the camber angle and to accordingly adjust the caster angle.

13. The autonomous vehicle of claim 11 wherein the vehicle dynamics prediction module outputs a display signal to a vehicle display to display camber information, wherein the camber information comprises a graphical or pictorial representation of the wheel and tire showing the camber angle.

14. The autonomous vehicle of claim 13 wherein the vehicle display also displays a camber adjustment interface element that is user-selectable to receive user input to adjust the camber angle and to further rotate or zoom the graphical or pictorial representation to view the wheel and tire and the vehicle from different perspectives or different zoom levels.

15. The autonomous vehicle of claim 11 wherein the vehicle dynamics prediction module predicts the transient lateral force profile for each wheel and sends control signals to each respective camber adjustment actuator providing a wheel-specific time-varying camber angle for dynamically adjusting the camber angle during cornering.

16. An autonomous vehicle comprising:
a chassis;
a plurality of wheels rotationally mounted to the chassis, wherein each wheel is characterized by a caster angle;
a Global Navigation Satellite System (GNSS) receiver to determine a current location of the autonomous vehicle;
a vehicle navigation system cooperating with the GNSS receiver to provide a route for the autonomous vehicle;
a processor executing a vehicle dynamics prediction module that is configured to identify a curve that the autonomous vehicle is approaching along the route, to determine a predicted speed at the curve, and to determine a turn profile of the curve, the turn profile being characterized by a varying radius of curvature, to predict a vehicle dynamics condition characterized by an expected cornering force on each wheel based on the predicted speed at the curve and the varying radius of curvature of the turn profile and to generate a control signal for each wheel based on the vehicle dynamics condition, wherein the vehicle dynamics prediction module predicts a transient lateral force profile based on the varying radius of curvature of the curve and the predicted speed of the autonomous vehicle at the curve, and determines a time-varying caster angle for dynamically adjusting the caster angle through the curve; and
a caster adjustment actuator for each wheel for automatically adjusting the caster angle of each wheel in response to the control signal, wherein the caster angle is dynamically adjusted through the curve in accordance with the time-varying caster angle.

17. The autonomous vehicle of claim 16 wherein the vehicle dynamics prediction module receives and applies a user-specified drive mode from a plurality of user-selectable drive modes to modify the caster angle wherein the autonomous vehicle stores a camber-caster correlation to enable the autonomous vehicle to determine a camber angle based on the caster angle and to accordingly adjust the camber angle.

18. The autonomous vehicle of claim 17 comprising a vehicle display that displays vehicle performance data associated with a camber-caster setting, wherein the vehicle performance data includes one or more of fuel economy, battery range, lateral g-force when cornering, braking distance, acceleration, and tire tread wear.

19. The autonomous vehicle of claim 16 wherein the vehicle dynamics prediction module outputs a display signal to a vehicle display to display caster information wherein the caster information comprises a graphical or pictorial representation of the wheel and tire showing the caster angle.

20. The autonomous vehicle of claim 19 wherein the vehicle display also displays a caster adjustment interface element that is user-selectable to receive user input to adjust the caster angle and to further rotate or zoom the graphical or pictorial representation to view the wheel and tire and the vehicle from different perspectives or different zoom levels.

* * * * *